United States Patent
Daniel et al.

(10) Patent No.: US 11,100,812 B2
(45) Date of Patent: *Aug. 24, 2021

(54) VIRTUAL REALITY AND REAL WELDING TRAINING SYSTEM AND METHOD

(71) Applicant: Lincoln Global, Inc., Santa Fe Springs, CA (US)

(72) Inventors: Joseph A. Daniel, Sagamore Hills, OH (US); Deanna Postlethwaite, Chagrin Falls, OH (US); George D. Blankenship, Chardon, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/106,170

(22) Filed: Aug. 21, 2018

(65) Prior Publication Data

US 2018/0357923 A1     Dec. 13, 2018

Related U.S. Application Data

(63) Continuation of application No. 14/526,914, filed on Oct. 29, 2014, now Pat. No. 1,003,627.

(60) Provisional application No. 61/900,136, filed on Nov. 5, 2013.

(51) Int. Cl.
*G09B 19/24* (2006.01)
*B23K 9/095* (2006.01)
*B23K 9/09* (2006.01)
*B23K 9/10* (2006.01)

(52) U.S. Cl.
CPC ............. *G09B 19/24* (2013.01); *B23K 9/09* (2013.01); *B23K 9/095* (2013.01); *B23K 9/0953* (2013.01); *B23K 9/0956* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS

| | | | |
|---|---|---|---|
| 317,063 | A | 5/1885 | Wittenstrom |
| 428,459 | A | 5/1890 | Coffin |
| 483,428 | A | 9/1892 | Goppin |
| 1,159,119 | A | 11/1915 | Springer |
| 1,286,529 | A | 12/1918 | Cave |

(Continued)

FOREIGN PATENT DOCUMENTS

| | | |
|---|---|---|
| CA | 2698078 | 9/2011 |
| CN | 1665633 | 9/2005 |

(Continued)

OTHER PUBLICATIONS

Bargteil et al., "A Semi-Lagrangian Contouring Method for Fluid Simulation," ACM Transactions on Graphics, vol. 25, No. 1, Jan. 2006, pp. 19-38.

(Continued)

*Primary Examiner* — Robert J Utama
(74) *Attorney, Agent, or Firm* — Calfee, Halter & Griswold LLP

(57) ABSTRACT

A virtual welding station includes a virtual sequencer for simulating different welding techniques and non-welding operations. The virtual welding station can be used to train an operator on the production of complete assemblies.

16 Claims, 20 Drawing Sheets

(56) References Cited

U.S. PATENT DOCUMENTS

| | | |
|---|---|---|
| 2,326,944 A | 8/1943 | Holand |
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson |
| 3,654,421 A | 4/1972 | Streetman |
| 3,690,020 A | 9/1972 | McBratnie |
| 3,739,140 A | 6/1973 | Rotilio |
| 3,852,917 A | 12/1974 | McKown |
| 3,866,011 A | 2/1975 | Cole |
| 3,867,769 A | 2/1975 | Schow |
| 3,904,845 A | 9/1975 | Minkiewicz |
| 3,988,913 A | 11/1976 | Metcalfe |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros |
| 4,280,041 A | 7/1981 | Kiessling |
| 4,280,137 A | 7/1981 | Ashida |
| 4,314,125 A | 2/1982 | Nakamura |
| 4,354,087 A | 10/1982 | Osterlitz |
| 4,359,622 A | 11/1982 | Dostoomian |
| 4,375,026 A | 2/1983 | Kearney |
| 4,410,787 A | 10/1983 | Kremers |
| 4,429,266 A | 1/1984 | Traadt |
| 4,452,589 A | 6/1984 | Denison |
| D275,292 S | 8/1984 | Bouman |
| D277,761 S | 2/1985 | Korovin |
| 4,525,619 A | 6/1985 | Ide |
| D280,329 S | 8/1985 | Bouman |
| 4,555,614 A | 11/1985 | Morris et al. |
| 4,611,111 A | 9/1986 | Baheti |
| 4,616,326 A | 10/1986 | Meier |
| 4,629,860 A | 12/1986 | Lindborn |
| 4,677,277 A | 6/1987 | Cook |
| 4,680,014 A | 7/1987 | Paton |
| 4,689,021 A | 8/1987 | Vasiliev |
| 4,707,582 A | 11/1987 | Beyer |
| 4,716,273 A | 12/1987 | Paton |
| D297,704 S | 9/1988 | Bulow |
| 4,812,614 A | 3/1989 | Wang |
| 4,867,685 A | 9/1989 | Brush |
| 4,877,940 A | 10/1989 | Bangs |
| 4,897,521 A | 1/1990 | Burr |
| 4,907,973 A | 3/1990 | Hon |
| 4,931,018 A | 6/1990 | Herbst |
| 4,973,814 A | 11/1990 | Kojima |
| 4,998,050 A | 3/1991 | Nishiyama |
| 5,034,593 A | 7/1991 | Rice |
| 5,061,841 A | 10/1991 | Richardson |
| 5,089,914 A | 2/1992 | Prescott |
| 5,192,845 A | 3/1993 | Kirmsse |
| 5,206,472 A | 4/1993 | Myking |
| 5,266,930 A | 11/1993 | Ichikawa |
| 5,283,418 A | 2/1994 | Bellows |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming |
| 5,360,156 A | 11/1994 | Ishizaka |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb |
| 5,436,638 A | 7/1995 | Bolas |
| 5,464,957 A | 11/1995 | Kidwell |
| 5,465,037 A | 11/1995 | Huissoon |
| D365,583 S | 12/1995 | Viken |
| 5,493,093 A | 2/1996 | Cecil |
| 5,547,052 A | 8/1996 | Latshaw |
| 5,562,843 A | 10/1996 | Yasumoto |
| 5,662,822 A | 9/1997 | Tada |
| 5,670,071 A | 9/1997 | Tomoyuki |
| 5,676,503 A | 10/1997 | Lang |
| 5,676,867 A | 10/1997 | Van Allen |
| 5,708,253 A | 1/1998 | Bloch |
| 5,710,405 A | 1/1998 | Solomon |
| 5,719,369 A | 2/1998 | White |
| D392,534 S | 3/1998 | Degen |
| 5,728,991 A | 3/1998 | Takada |
| 5,751,258 A | 5/1998 | Fergason |
| D395,296 S | 6/1998 | Kaya |
| 5,774,110 A | 6/1998 | Edelson |
| D396,238 S | 7/1998 | Schmitt |
| 5,781,258 A | 7/1998 | Debral |
| 5,823,785 A | 10/1998 | Matherne |
| 5,835,077 A | 11/1998 | Dao |
| 5,835,277 A | 11/1998 | Hegg |
| 5,845,053 A | 12/1998 | Watanabe |
| 5,877,777 A | 3/1999 | Colwell |
| 5,963,891 A | 10/1999 | Walker |
| 6,008,470 A | 12/1999 | Zhang |
| 6,037,948 A | 3/2000 | Liepa |
| 6,049,059 A | 4/2000 | Kim |
| 6,051,805 A | 4/2000 | Vaidya |
| 6,114,645 A | 9/2000 | Burgess |
| 6,155,475 A | 12/2000 | Ekelof |
| 6,155,928 A | 12/2000 | Burdick |
| 6,230,327 B1 | 5/2001 | Briand |
| 6,236,013 B1 | 5/2001 | Delzenne |
| 6,236,017 B1 | 5/2001 | Smartt |
| 6,242,711 B1 | 6/2001 | Cooper |
| 6,271,500 B1 | 8/2001 | Hirayam |
| 6,301,763 B1 | 10/2001 | Pryor |
| 6,330,938 B1 | 12/2001 | Herve |
| 6,330,966 B1 | 12/2001 | Eissfeller |
| 6,331,848 B1 | 12/2001 | Stove |
| D456,428 S | 4/2002 | Aronson |
| 6,373,465 B2 | 4/2002 | Jolly |
| 6,377,011 B1 | 4/2002 | Ben-Ur |
| D456,828 S | 5/2002 | Aronson |
| 6,396,232 B2 | 5/2002 | Haanpaa |
| D461,383 S | 8/2002 | Blackburn |
| 6,427,352 B1 | 8/2002 | Pfeiffer |
| 6,441,342 B1 | 8/2002 | Hsu |
| 6,445,964 B1 | 9/2002 | White |
| 6,492,618 B1 | 12/2002 | Flood |
| 6,506,997 B2 | 1/2003 | Matsuyama |
| 6,552,303 B1 | 4/2003 | Blankenship |
| 6,560,029 B1 | 5/2003 | Dobbie |
| 6,563,489 B1 | 5/2003 | Latypov |
| 6,568,846 B1 | 5/2003 | Cote |
| D475,726 S | 6/2003 | Suga |
| 6,572,379 B1 | 6/2003 | Sears |
| 6,583,386 B1 | 6/2003 | Ivkovich |
| 6,593,540 B1 | 7/2003 | Baker |
| 6,621,049 B2 | 9/2003 | Suzuki |
| 6,624,388 B1 | 9/2003 | Blankenship |
| D482,171 S | 11/2003 | Vui |
| 6,647,288 B2 | 11/2003 | Madill |
| 6,649,858 B2 | 11/2003 | Wakeman |
| 6,655,645 B1 | 12/2003 | Lu |
| 6,660,965 B2 | 12/2003 | Simpson |
| 6,679,702 B1 | 1/2004 | Rau |
| 6,697,701 B2 | 2/2004 | Hillen |
| 6,697,770 B1 | 2/2004 | Nagetgaal |
| 6,703,585 B2 | 3/2004 | Suzuki |

(56) References Cited

U.S. PATENT DOCUMENTS

| | | |
|---|---|---|
| 6,708,385 B1 | 3/2004 | Lemelson |
| 6,710,298 B2 | 3/2004 | Eriksson |
| 6,710,299 B2 | 3/2004 | Blankenship |
| 6,715,502 B1 | 4/2004 | Rome |
| D490,347 S | 5/2004 | Meyers |
| 6,730,875 B2 | 5/2004 | Hsu |
| 6,734,393 B1 | 5/2004 | Friedl |
| 6,744,011 B1 | 6/2004 | Hu |
| 6,750,428 B2 | 6/2004 | Okamoto |
| 6,765,584 B1 | 7/2004 | Matthias |
| 6,772,802 B2 | 8/2004 | Few |
| 6,788,442 B1 | 9/2004 | Potin |
| 6,795,778 B2 | 9/2004 | Dodge |
| 6,798,974 B1 | 9/2004 | Nakano |
| 6,857,553 B1 | 2/2005 | Hartman |
| 6,858,817 B2 | 2/2005 | Blankenship |
| 6,865,926 B2 | 3/2005 | O'Brien |
| D504,449 S | 4/2005 | Butchko |
| 6,920,371 B2 | 7/2005 | Hillen |
| 6,940,039 B2 | 9/2005 | Blankenship |
| 6,982,700 B2 | 1/2006 | Rosenberg |
| 7,021,937 B2 | 4/2006 | Simpson |
| 7,024,342 B1 | 4/2006 | Waite |
| 7,110,859 B2 | 9/2006 | Shibata |
| 7,126,078 B2 | 10/2006 | Demers |
| 7,132,617 B2 | 11/2006 | Lee |
| 7,170,032 B2 | 1/2007 | Flood |
| 7,194,447 B2 | 3/2007 | Harvey |
| 7,233,837 B2 | 6/2007 | Swain |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily |
| D561,973 S | 2/2008 | Kinsley |
| 7,353,715 B2 | 4/2008 | Myers |
| 7,363,137 B2 | 4/2008 | Brant |
| 7,375,304 B2 | 5/2008 | Kainec |
| 7,381,923 B2 | 6/2008 | Gordon |
| 7,414,595 B1 | 8/2008 | Muffler |
| 7,465,230 B2 | 12/2008 | Lemay |
| 7,474,760 B2 | 1/2009 | Hertzman |
| 7,478,108 B2 | 1/2009 | Townsend |
| D587,975 S | 3/2009 | Aronson |
| 7,487,018 B2 | 4/2009 | Lee |
| 7,516,022 B2 | 4/2009 | Lee |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender |
| 7,643,890 B1 | 1/2010 | Hillen |
| 7,687,741 B2 | 3/2010 | Kainec |
| D614,217 S | 4/2010 | Peters |
| D615,573 S | 5/2010 | Peters |
| 7,817,162 B2 | 10/2010 | Bolick |
| 7,853,645 B2 | 12/2010 | Brown |
| D631,074 S | 1/2011 | Peters |
| 7,874,921 B2 | 1/2011 | Baszucki |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear |
| 8,248,324 B2 | 8/2012 | Nangle |
| 8,265,886 B2 | 9/2012 | Bisiaux |
| 8,274,013 B2 | 9/2012 | Wallace |
| 8,287,522 B2 | 10/2012 | Moses |
| 8,292,723 B2 | 10/2012 | DeWaal |
| 8,301,286 B2 | 10/2012 | Babu |
| 8,316,462 B2 | 11/2012 | Becker |
| 8,363,048 B2 | 1/2013 | Gering |
| 8,365,603 B2 | 2/2013 | Lesage |
| 8,512,043 B2 | 8/2013 | Choquet |
| 8,569,646 B2 | 10/2013 | Daniel |
| 8,657,605 B2 | 2/2014 | Wallace |
| 8,680,434 B2 | 3/2014 | Stoger |
| 8,692,157 B2 | 4/2014 | Daniel |
| 8,747,116 B2 | 6/2014 | Zboray |
| 8,777,629 B2 | 7/2014 | Kreindl |
| 8,787,051 B2 | 7/2014 | Chang |
| 8,834,168 B2 | 9/2014 | Peters |
| 8,851,896 B2 | 10/2014 | Wallace |
| 8,911,237 B2 | 12/2014 | Postlewaite |
| 8,915,740 B2 | 12/2014 | Zboray |
| RE45,398 E | 3/2015 | Wallace |
| 8,992,226 B1 | 3/2015 | Leach |
| 9,011,154 B2 | 4/2015 | Kindig |
| 9,293,056 B2 | 3/2016 | Zboray |
| 9,293,057 B2 | 3/2016 | Zboray |
| 9,779,635 B2 | 10/2017 | Zboray |
| 9,836,987 B2 | 12/2017 | Postlewaite |
| 10,083,627 B2 * | 9/2018 | Daniel ................ G09B 19/24 |
| 2001/0045808 A1 | 11/2001 | Hietmann |
| 2001/0052893 A1 | 12/2001 | Jolly |
| 2002/0032553 A1 | 3/2002 | Simpson |
| 2002/0039138 A1 | 4/2002 | Edelson |
| 2002/0046999 A1 | 4/2002 | Veikkolainen |
| 2002/0005421 A1 | 5/2002 | Edelson |
| 2002/0050984 A1 | 5/2002 | Roberts |
| 2002/0085843 A1 | 7/2002 | Mann |
| 2002/0094026 A1 | 7/2002 | Edelson |
| 2002/0098468 A1 | 7/2002 | Barrett |
| 2002/0111557 A1 | 8/2002 | Madill |
| 2002/0132213 A1 | 9/2002 | Grant |
| 2002/0135695 A1 | 9/2002 | Edelson |
| 2002/0175897 A1 | 11/2002 | Pelosi |
| 2002/0178038 A1 | 11/2002 | Grybas |
| 2002/0180761 A1 | 12/2002 | Edelson |
| 2003/0000931 A1 | 1/2003 | Ueda |
| 2003/0002740 A1 | 1/2003 | Melikian |
| 2003/0023592 A1 | 1/2003 | Modica |
| 2003/0025884 A1 | 2/2003 | Hamana |
| 2003/0062354 A1 | 4/2003 | Ward |
| 2003/0075534 A1 | 4/2003 | Okamoto |
| 2003/0106787 A1 | 6/2003 | Santilli |
| 2003/0111451 A1 | 6/2003 | Blankenship |
| 2003/0172032 A1 | 9/2003 | Choquet |
| 2003/0186199 A1 | 10/2003 | McCool |
| 2003/0228560 A1 | 12/2003 | Seat |
| 2003/0234885 A1 | 12/2003 | Pilu |
| 2004/0009462 A1 | 1/2004 | McElwrath |
| 2004/0020907 A1 | 2/2004 | Zauner |
| 2004/0035990 A1 | 2/2004 | Ackeret |
| 2004/0050824 A1 | 3/2004 | Samler |
| 2004/0088071 A1 | 5/2004 | Kouno |
| 2004/0140301 A1 | 7/2004 | Blankenship |
| 2004/0167788 A1 | 8/2004 | Birimisa |
| 2004/0181382 A1 | 9/2004 | Hu |
| 2005/0007504 A1 | 1/2005 | Fergason |
| 2005/0017152 A1 | 1/2005 | Fergason |
| 2005/0029326 A1 | 2/2005 | Henrikson |
| 2005/0046584 A1 | 3/2005 | Breed |
| 2005/0050168 A1 | 3/2005 | Wen |
| 2005/0101767 A1 | 5/2005 | Clapham |
| 2005/0103766 A1 | 5/2005 | Iizuka |
| 2005/0103767 A1 | 5/2005 | Kainec |
| 2005/0103768 A1 | 5/2005 | Ward |
| 2005/0109735 A1 | 5/2005 | Flood |
| 2005/0128186 A1 | 6/2005 | Shahoian |
| 2005/0133488 A1 | 6/2005 | Blankenship |
| 2005/0159840 A1 | 7/2005 | Lin |
| 2005/0163364 A1 | 7/2005 | Beck |
| 2005/0189336 A1 | 9/2005 | Ku |
| 2005/0199602 A1 | 9/2005 | Kaddani |
| 2005/0230573 A1 | 10/2005 | Ligertwood |
| 2005/0233295 A1 | 10/2005 | Chiszar |
| 2005/0252897 A1 | 11/2005 | Hsu |
| 2005/0275913 A1 | 12/2005 | Vesely |
| 2005/0275914 A1 | 12/2005 | Vesely |
| 2006/0014130 A1 | 1/2006 | Weinstein |
| 2006/0076321 A1 | 4/2006 | Maev |
| 2006/0136183 A1 | 6/2006 | Choquet |
| 2006/0140502 A1 | 6/2006 | Tseng |
| 2006/0154226 A1 | 7/2006 | Maxfield |
| 2006/0163227 A1 | 7/2006 | Hillen |

(56) References Cited

U.S. PATENT DOCUMENTS

| | | |
|---|---|---|
| 2006/0163228 A1 | 7/2006 | Daniel |
| 2006/0166174 A1 | 7/2006 | Rowe |
| 2006/0169682 A1 | 8/2006 | Kainec |
| 2006/0173619 A1 | 8/2006 | Brant |
| 2006/0183083 A1 | 8/2006 | Moran et al. |
| 2006/0189260 A1 | 8/2006 | Sung |
| 2006/0207980 A1 | 9/2006 | Jacovetty |
| 2006/0213892 A1 | 9/2006 | Ott |
| 2006/0214924 A1 | 9/2006 | Kawamoto |
| 2006/0226137 A1 | 10/2006 | Huismann |
| 2006/0241432 A1 | 10/2006 | Herline |
| 2006/0252543 A1 | 11/2006 | Van Noland |
| 2006/0258447 A1 | 11/2006 | Baszucki |
| 2007/0034611 A1 | 2/2007 | Drius |
| 2007/0038400 A1 | 2/2007 | Lee |
| 2007/0045488 A1 | 3/2007 | Shin |
| 2007/0088536 A1 | 4/2007 | Ishikawa |
| 2007/0112889 A1 | 5/2007 | Cook |
| 2007/0164007 A1 | 7/2007 | Peters et al. |
| 2007/0188606 A1 | 8/2007 | Atkinson |
| 2007/0198117 A1 | 8/2007 | Wajihuddin |
| 2007/0211026 A1 | 9/2007 | Ohta |
| 2007/0221797 A1 | 9/2007 | Thompson |
| 2007/0256503 A1 | 11/2007 | Wong |
| 2007/0264620 A1 | 11/2007 | Maddix |
| 2007/0277611 A1 | 12/2007 | Portzgen |
| 2007/0291035 A1 | 12/2007 | Vesely |
| 2008/0021311 A1 | 1/2008 | Goldbach |
| 2008/0027594 A1 | 1/2008 | Jump |
| 2008/0031774 A1 | 2/2008 | Magnant |
| 2008/0038702 A1 | 2/2008 | Choquet |
| 2008/0061049 A1 | 3/2008 | Albrecht |
| 2008/0078811 A1 | 4/2008 | Hillen |
| 2008/0078812 A1 | 4/2008 | Peters |
| 2008/0107345 A1 | 5/2008 | Melikian |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer |
| 2008/0140815 A1 | 6/2008 | Brant |
| 2008/0149686 A1 | 6/2008 | Daniel |
| 2008/0203075 A1 | 8/2008 | Feldhausen |
| 2008/0233550 A1 | 9/2008 | Solomon |
| 2008/0249998 A1 | 10/2008 | Dettinger |
| 2008/0303197 A1 | 12/2008 | Paquette |
| 2008/0314887 A1 | 12/2008 | Stoger |
| 2009/0015585 A1 | 1/2009 | Klusza |
| 2009/0021514 A1 | 1/2009 | Klusza |
| 2009/0045183 A1 | 2/2009 | Artelsmair |
| 2009/0050612 A1 | 2/2009 | Serruys |
| 2009/0057286 A1 | 3/2009 | Ihara |
| 2009/0109128 A1 | 4/2009 | Nangle |
| 2009/0152251 A1 | 6/2009 | Dantinne |
| 2009/0173726 A1 | 7/2009 | Davidson |
| 2009/0184098 A1 | 7/2009 | Daniel |
| 2009/0197228 A1 | 8/2009 | Afshar |
| 2009/0200281 A1 | 8/2009 | Hampton |
| 2009/0200282 A1 | 8/2009 | Hampton |
| 2009/0231423 A1 | 9/2009 | Becker |
| 2009/0257655 A1 | 10/2009 | Melikian |
| 2009/0259444 A1 | 10/2009 | Dolansky |
| 2009/0298024 A1 | 12/2009 | Batzler |
| 2009/0312958 A1 | 12/2009 | Dai |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace |
| 2010/0062405 A1 | 3/2010 | Zboray |
| 2010/0062406 A1 | 3/2010 | Zboray |
| 2010/0096373 A1 | 4/2010 | Hillen |
| 2010/0121472 A1 | 5/2010 | Babu |
| 2010/0133247 A1 | 6/2010 | Mazumder |
| 2010/0133250 A1 | 6/2010 | Sardy |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper |
| 2010/0299101 A1 | 11/2010 | Shimada |
| 2010/0307249 A1 | 12/2010 | Lesage |
| 2010/0314362 A1 | 12/2010 | Albrecht |
| 2010/0326962 A1 | 12/2010 | Calla et al. |
| 2011/0006047 A1 | 1/2011 | Penrod |
| 2011/0048273 A1 | 3/2011 | Colon |
| 2011/0052046 A1 | 3/2011 | Melikian |
| 2011/0060568 A1 | 3/2011 | Goldfine |
| 2011/0082728 A1 | 4/2011 | Melikian |
| 2011/0091846 A1 | 4/2011 | Kreindl |
| 2011/0114615 A1 | 5/2011 | Daniel |
| 2011/0116076 A1 | 5/2011 | Chantry |
| 2011/0117527 A1 | 5/2011 | Conrardy |
| 2011/0122495 A1 | 5/2011 | Togashi |
| 2011/0183304 A1 | 7/2011 | Wallace |
| 2011/0187746 A1 | 8/2011 | Suto |
| 2011/0187859 A1 | 8/2011 | Edelson |
| 2011/0229864 A1 | 9/2011 | Short |
| 2011/0248864 A1 | 10/2011 | Becker |
| 2011/0316516 A1 | 12/2011 | Schiefermuller |
| 2012/0122062 A1 | 5/2012 | Yang et al. |
| 2012/0189993 A1 | 7/2012 | Kindig |
| 2012/0291172 A1 | 11/2012 | Wills |
| 2012/0298640 A1 | 11/2012 | Conrardy |
| 2013/0026150 A1 | 1/2013 | Chantry |
| 2013/0040270 A1 | 2/2013 | Albrecht |
| 2013/0049976 A1 | 2/2013 | Maggiore |
| 2013/0075380 A1 | 3/2013 | Albrech |
| 2013/0119040 A1 | 5/2013 | Suraba |
| 2013/0170259 A1 | 7/2013 | Chang |
| 2013/0182070 A1 | 7/2013 | Peters |
| 2013/0183645 A1 | 7/2013 | Wallace |
| 2013/0189657 A1 | 7/2013 | Wallace |
| 2013/0189658 A1 | 7/2013 | Peters |
| 2013/0203029 A1 | 8/2013 | Choquet |
| 2013/0206740 A1 | 8/2013 | Pfeifer |
| 2013/0209976 A1 | 8/2013 | Postlethwaite |
| 2013/0230832 A1 | 9/2013 | Peters |
| 2013/0231980 A1 | 9/2013 | Choquet |
| 2013/0252214 A1 | 9/2013 | Eigart |
| 2013/0288211 A1 | 10/2013 | Patterson |
| 2013/0327747 A1 | 12/2013 | Dantinne |
| 2013/0342678 A1 | 12/2013 | McAninch |
| 2014/0017642 A1 | 1/2014 | Postlethwaite et al. |
| 2014/0038143 A1 | 2/2014 | Daniel |
| 2014/0042136 A1 | 2/2014 | Daniel |
| 2014/0065584 A1 | 3/2014 | Wallace et al. |
| 2014/0134580 A1 | 5/2014 | Becker |
| 2014/0263224 A1 | 9/2014 | Becker |
| 2014/0272835 A1* | 9/2014 | Becker ............... B23K 9/0953 434/234 |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056584 A1 | 2/2015 | Boulware |
| 2015/0056585 A1 | 2/2015 | Boulware |
| 2015/0056586 A1 | 2/2015 | Penrod |
| 2015/0072323 A1 | 3/2015 | Postlethwaite |
| 2015/0125836 A1 | 5/2015 | Daniel |
| 2015/0194072 A1 | 7/2015 | Becker et al. |
| 2015/0194073 A1 | 7/2015 | Becker |
| 2015/0235565 A1 | 8/2015 | Postlethwaite |
| 2015/0248846 A1 | 9/2015 | Postlethwaite |
| 2016/0093233 A1 | 3/2016 | Boulware |
| 2016/0125763 A1 | 5/2016 | Becker |
| 2016/0203734 A1 | 7/2016 | Boulware |
| 2016/0203735 A1 | 7/2016 | Boulware |
| 2016/0260261 A1 | 9/2016 | Hsu |
| 2016/0331592 A1 | 11/2016 | Stewart |
| 2016/0343268 A1 | 11/2016 | Postlethwaite |
| 2017/0053557 A1 | 2/2017 | Daniel |

(56) References Cited

U.S. PATENT DOCUMENTS

FOREIGN PATENT DOCUMENTS

| | | |
|---|---|---|
| CN | 201083660 Y | 7/2008 |
| CN | 201149744 | 11/2008 |
| CN | 101406978 | 4/2009 |
| CN | 101419755 A1 | 4/2009 |
| CN | 201229711 Y | 4/2009 |
| CN | 101571887 A | 11/2009 |
| CN | 101587659 A | 11/2009 |
| CN | 101661589 | 3/2010 |
| CN | 102053563 | 5/2011 |
| CN | 102202836 | 9/2011 |
| CN | 202053009 | 11/2011 |
| CN | 202684308 U | 1/2013 |
| CN | 203503228 | 3/2014 |
| CN | 103871279 A | 6/2014 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 102006048165 | 1/2008 |
| DE | 10 2010 038 902 A1 | 2/2012 |
| DE | 202012013151 U1 | 2/2015 |
| EP | 0008527 | 1/1982 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| FR | 1456780 | 3/1965 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | H07214317 A | 8/1995 |
| JP | 07-232270 | 9/1995 |
| JP | 08-505091 | 4/1996 |
| JP | 08-150476 | 6/1996 |
| JP | H08221107 | 8/1996 |
| JP | 08-132274 | 5/1998 |
| JP | H1133963 A | 2/1999 |
| JP | 2000-167666 A | 6/2000 |
| JP | 2000-237872 | 9/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2004025270 | 1/2004 |
| JP | 2006-006604 A | 1/2006 |
| JP | 2006175205 | 7/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2010-225129 | 10/2010 |
| JP | 2010231792 | 10/2010 |
| JP | 2012024867 A | 2/2012 |
| JP | 2012218058 A | 11/2012 |
| KR | 100876425 | 12/2008 |
| KR | 20090010693 | 1/2009 |
| KR | 1020090111556 A | 10/2009 |
| KR | 20110068544 | 6/2011 |
| RU | 527045 | 7/1995 |
| RU | 2317183 | 2/2008 |
| RU | 2008 108 601 C1 | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2004029549 | 4/2004 |
| WO | 2005102230 A1 | 11/2005 |
| WO | 2005110658 | 11/2005 |
| WO | 2006034571 A1 | 4/2006 |
| WO | 2007009131 | 1/2007 |
| WO | 2007039278 | 4/2007 |
| WO | 2009120921 | 1/2009 |
| WO | 2009060231 A1 | 5/2009 |
| WO | 2010020867 | 8/2009 |
| WO | 2009149740 A1 | 12/2009 |
| WO | 2010000003 A2 | 1/2010 |
| WO | 2010020870 | 2/2010 |
| WO | 2010044982 | 4/2010 |
| WO | 2010091493 A1 | 8/2010 |
| WO | 2011017608 A1 | 2/2011 |
| WO | 2011041037 A1 | 4/2011 |
| WO | 2011045654 A1 | 4/2011 |
| WO | 2011058433 | 5/2011 |
| WO | 2011059502 | 5/2011 |
| WO | 2011060350 A1 | 5/2011 |
| WO | 2011067447 A1 | 6/2011 |
| WO | 2011097035 A2 | 8/2011 |
| WO | 2011150165 A1 | 12/2011 |
| WO | 2012016851 | 2/2012 |
| WO | 2012082105 A1 | 6/2012 |
| WO | 2012137060 A1 | 10/2012 |
| WO | 2012143327 A1 | 10/2012 |
| WO | 2013014202 A1 | 1/2013 |
| WO | 2013-025672 | 2/2013 |
| WO | 2013061518 | 5/2013 |
| WO | 2013114189 A1 | 8/2013 |
| WO | 2013119749 | 8/2013 |
| WO | 2013175079 A1 | 11/2013 |
| WO | 2013186413 | 12/2013 |
| WO | 2014007830 A1 | 1/2014 |
| WO | 2014019045 A1 | 2/2014 |
| WO | 2014020386 | 2/2014 |
| WO | 2014140720 | 9/2014 |
| WO | 2014184710 | 11/2014 |
| WO | 2016-137578 | 9/2016 |

OTHER PUBLICATIONS

Chentanez et al., "Liquid Simulation on Lattice-Based Tetrahedral Meshes," Eurographics/ACM SIGGRAPH Symposium on Computer Animation (2007), 10 pages.

Chentanez et al., "Simultaneous Coupling of Fluids and Deformable Bodies," Eurographics/ ACM SIGGRAPH Symposium on Computer Animation, 2006, pp. 83-89.

Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.

Feldman et al., "Animating Suspended Particle Explosions," Computer Graphics Proceedings, Annual Conference Series, Jul. 27-31, 2003, pp. 1-8.

Feldman et al., "Fluids in Deforming Meshes," Eurographics/ACM SIGGRAPH Symposium on Computer Animation (2005), pp. 255-259.

Foster et al., "Practical Animation of Liquids," ACM SIGGRAPH, Aug. 12-17, 2001, Los Angeles, CA, pp. 23-30.

Foster et al., "Realistic Animation of Liquids," Graphical Models and Image Processing, vol. 58, No. 5, Sep. 1996, pp. 471-483.

Goktekin et al., "A Method for Animating Viscoelastic Fluids," Computer Graphics Proceedings, Annual Conference Series, Aug. 8-12, 2004, pp. 1-6.

Holmberg et al., "Efficient Modeling and Rendering of Turbulent Water over Natural Terrain," Proceedings of the 2nd International

(56) References Cited

OTHER PUBLICATIONS conference on Computer graphics and interactive techniques in Australasia and South East Asia, Singapore, Jun. 15-18, 2004, pp. 15-22.
Irving et al., "Efficient Simulation of Large Bodies of Water by Coupling Two and ThreeDimensional Techniques," ACM Transactions on Graphics (TOG), vol. 25, Issue 3, Jul. 2006,pp. 805-811.
Kass et al., "Rapid, Stable Fluid Dynamics for Computer Graphics," Computer Graphics, vol. 24, No. 4, Aug. 1990, pp. 49-57.
Klinger et al., "Fluid Animation with Dynamic Meshes," Computer Graphics Proceedings, Annual Conference Series, Jul. 30-Aug. 3, 2006, 820-825.
Muller et al., "Particle-Based Fluid Simulation for Interactive Applications," Eurographics/SIGGRAPH Symposium on Computer Animation (2003), pp. 154-159 and 372.
O'Brien et al., "Dynamic Simulation of Splashing Fluids," Proceedings of Computer Animation '95, Apr. 19-21, 1995, in Geneva, Switzerland, pp. 198-205.
Premoze et al., "Particle-Based Simulation of Fluids," EUROGRAPHICS, vol. 22, No. 3 (2003), 10 pages.
Rasmussen et al., "Directable Photorealistic Liquids," Eurographics/ACM SIGGRAPH Symposium on Computer Animation (2004), pp. 193-202.
Stam, "Stable Fluids," SIGGRAPH 99 Conference Proceedings, Annual Conference Series, Aug. 1999, 121-128.
Thurey et al., "Real-time Breaking Waves for Shallow Water Simulations," Proceedings of the Pacific Conference on Computer Graphics and Applications, Maui, Hawaii, Oct. 29-Nov. 2, 2007, 8 pages.
Yaoming, "Applications of Microcomputer in Robot Technology," Scientific and Technical Documentation Press, Sep. 1987, pp. 360-365.
1st OA from CN Application No. 201480060353.9 dated Mar. 30, 2018.
Communication pursuant to Article 94(3) EPC from EP Application No. 157329343 dated Apr. 24, 2018.
Communication pursuant to Article 94(3) EPC from EP Application No. 15731664.7 dated Jul. 13, 2018.
Andreas Grahn, "Interactive Simulation of Contrast Fluid using Smoothed Particle Hydrodynamics," Jan. 1, 2008, Masters Thesis in Computing Science, Umea University, Department of Computing Science, Umea Sweden; 69 pages.
Marcus Vesterlund, Simulation and Rendering of a Viscous Fluid using Smoothed Particle Hydrodynamics, Dec. 3, 2004, Master's Thesis in Computing Science, Umea University, Department of Computing Science, Umea Sweden; 46 pages.
M. Muller,, et al., Point Based Animation of Elastic, Plastic and Melting Objects, Eurographics/ACM SIGGRAPH Symposium on Computer Animation (2004); 11 pages.
Andrew Nealen, "Point-Based Animation of Elastic, Plastic, and Melting Objects," CG topics, Feb. 2005; 2 pages.
D. Tonnesen, Modeling Liquids and Solids using Thermal Particles, Proceedings of Graphics Interface'91, pp. 255-262, Calgary, Alberta, 1991.
CUDA Programming Guide Version 1.1, Nov. 29, 2007, 143 pages.
Websters II new college dictionary, 3rd ed., Houghton Mifflin Co., copyright 2005, Boston, MA, p. 1271, definition of Wake, 3 pages.
Da Dalto L, et al. "CS Wave: Learning welding motion in a virtual environment" Published in Proceedings of the IIW International Conference, Jul. 10-11, 2008; 19 pages.
CS Wave-Manual, "Virtual Welding Workbench User Manual 3.0" 2007; 25 pages.
Choquet, Claude. ARC+®: Today's Virtual Reality Solution for Welders, Published in Proceedings of the IIW International Conference; Jul. 10-11, 2008; 19 pages.
Welding Handbook, Welding Science & Technology, American Welding Society, Ninth Ed., Copyright 2001. Appendix A Terms and Definitions 54 pages.

Virtual Welding: A Low Cost Virtual Reality Welder Training System, NSRP RA 07-01—BRP Oral Review Meeting in Charleston, SC at ATI, Mar. 2008; 6 pages.
Dorin Aiteanu, "Virtual and Augmented Reality Supervisor for a New Welding Helmet Dissertation," Nov. 15, 2005; 154 pages.
Screen Shot of CS Wave Exercise 135.FWPG Root Pass Level 1 https://web.archive.org/web/20081128081858/http:/wave.c-s.fr/images/english/snap_evolution2.Jpg; 1 page.
Screen Shot of CS Wave Control Centre V3.0.0 https://web.archive.org/web/20081128081915/http:/wave.c-s.fr/images/english/snap_evolution4.jpg; 1 page.
Screen Shot of CS Wave Control Centre V3.0.0 https://web.archive.org/web/20081128081817/http:/wave.c-s.fr/images/english/snap_evolution6.jpg; 1 page.
Da Dalto L, et al. "CS Wave a Virtual learning tool for the welding motion," Mar. 14, 2008; 10 pages.
Nordruch, Stefan, et al. "Visual Online Monitoring of PGMAW Without a Lighting Unit", Jan. 2005; 14 pages.
The Evolution of Computer Graphics; Tony Tamasi, NVIDIA, 2008; 36 pages.
VRSim Powering Virtual Reality, www.lincolnelectric.com/en-us/eguipment/Iraining-eguipment/Pages/powered-by-'rsim.aspx, 2016, 1 page.
Hillers, B.; Graser, A. "Direct welding arc observation without harsh flicker," 8 pages, allegedly FABTECH International and AWS welding show, 2007.
Declaration of Dr. Michael Zyda, May 3, 2016, exhibit to IPR 2016-00905; 72 pages.
Declaration of Edward Bohnart, Apr. 27, 2016, exhibit to IPR 2016-00905; 23 pages.
Declaration of Dr. Michael Zyda, May 3, 2016, exhibit to IPR 2016-00904; 76 pages.
Declaration of Edward Bohnart, Apr. 27, 2016, exhibit to IPR 2016-00904; 22 pages.
Declaration of Axel Graeser, Apr. 17, 2016, exhibit to IPR 2016-00840; 88 pages.
International Search Report and Written Opinion from PCT/IB2014/002346 dated Feb. 24, 2015.
ARC+—Archived Press Release from WayBack Machine from Jan. 31, 2008-Apr. 22, 2013, Page, https://web.3rchive.org/web/20121006041803/http://www.123certification.com/en/article_press/index.htm, Jan. 21, 2016, 3 pages.
P. Tschirner et al., Virtual and Augmented Reality for Quality Improvement of Manual Welds National Institute of Standards and Technology, Jan. 2002, Publication 973, 24 pages.
Y. Wang et al., "Impingement of Filler Droplets and Weld Pool During Gas Metal Arc Welding Process" International Journal of Heat and Mass Transfer, Sep. 1999, 14 pages.
Larry Jeffus, "Welding Principles and Applications," Sixth Edition, 2008, 10 pages.
R.J. Renwick et al., "Experimental Investigation of GTA Weld Pool Oscillations," Welding Research—Supplement to the Welding Journal, Feb. 1983, 7 pages.
Matt Phar, "GPU Gems 2 Programming Techniques for High-Performance Graphics and General-Purpose Computation," 2005, 12 pages.
International Search Report and Written Opinion from PCT/IB2015/000161 dated Jun. 8, 2015.
International Search Report and Written Opinion from PCT/IB2015/000257 dated Jul. 3, 2015.
International Search Report and Written Opinion from PCT/IB2015/000777 dated Sep. 21, 2015.
International Search Report and Written Opinion from PCT/IB2015/000814 dated Nov. 5, 2015.
International Search Report and Written Opinion from PCT/IB2015/001711 dated Jan. 4, 2016.
International Preliminary Report on Patentability from PCT/IB2014/001796 dated Mar. 15, 2016.
International Preliminary Report on Patentability from PCT/IB2015/000161 dated Aug. 25, 2016.
International Preliminary Report on Patentability from PCT/IB2015/000257 dated Sep. 15, 2016.

(56) References Cited

OTHER PUBLICATIONS

International Search Report and Written Opinion from PCT/IB2015/000777 dated Dec. 15, 2016.
International Search Report and Written Opinion from PCT/IB2015/000814 dated Dec. 15, 2016.
International Preliminary Report on Patentability from PCT/IB2015/001084 dated Jan. 26, 2017.
Extended European Search Report from EP Application No. 10860823.3 dated Jun. 6, 2017.
Communication Pursuant to Article 94(3) EPC in EP Application No. 13753204.0 dated Mar. 9, 2017.
Office action from U.S. Appl. No. 12/499,687 dated Oct. 16, 2012.
Office action from U.S. Appl. No. 12/499,687 dated Jun. 26, 2013.
Notice of Allowance from U.S. Appl. No. 12/966,570 dated Apr. 29, 2014.
Corrected Notice of Allowance from U.S. Appl. No. 12/966,570 dated Feb. 23, 2015.
Communication pursuant to Article 94(3) EPC from EP Application No. 14815865.2 dated Nov. 23, 2018.
Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.
ViziTech USA, retrieved on Mar. 27, 2014 from http://vizitechusa.com/, 2 pages.
Guu and Rokhlin, Technique for Simultaneous Real-Time Measurements of Weld Pool Surface Geometry and Arc Force, 10 pages, Dec. 1992.
William T. Reeves, "Particles Systems—A Technique for Modeling a Class of Fuzzy Objects", Computer Graphics 17:3 pp. 359-376, 1983, 17 pages.
S.B. Chen, L. Wu, Q. L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
D'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
M. Jonsson, L. Karlsson, and L-E Lindgren, Simulation of Tack Welding Procedures in Butt Joint Welding of Plates Welding Research Supplement, Oct. 1985, 7 pages.
Isaac Brana Veiga, Simulation of a Work Cell in the Igrip Program, dated 2006, 50 pages.
Balijepalli, A. and Kesavadas, Haptic Interfaces for Virtual Environment and Teleoperator Systems, Haptics 2003, Department of Mechanical & Aerospace Engineering, State University of New York at Buffalo, NY.
Johannes Hirche, Alexander Ehlert, Stefan Guthe, Michael Doggett, Hardware Accelerated Per-Pixel Displacement Mapping, 8 pages.
Yao et al., 'Development of a Robot System for Pipe Welding'. 2010 International Conference on Measuring technology and Mechatronics Automation. Retrieved from the Internet: http://ieeexplore.ieee.org/stamp/stamp.jsp? tp=&arnumber=5460347&tag=1; pp. 1109-1112, 4 pages.
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.
KYT Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.
Terrence O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, 10 pages, Dec. 10, 2001.
Echtler et al, "17 The Intelligent Welding Gun: Augmented Reality for Experimental Vehicle Construction," Virtual and Augmented Reality Applications in Manufacturing (2003) pp. 1-27.
Teeravarunyou et al, "Computer Based Welding Training System," International Journal of Industrial Engineering (2009) 16(2): 116-125.
Antonelli et al, "A Semi-Automated Welding Station Exploiting Human-Robot Interaction," Advanced Manufacturing Systems and Technology (2011) pp. 249-260.
Praxair Technology Inc, "The RealWeld Trainer System: Real Weld Training Under Real Conditions" Brochure (2013) 2 pages.
Xie et al., "A Real-Time Welding Training System Base on Virtual Reality," Wuhan Onew Technology Co., Lid, IEEE Virtual Reality Conference 2015, Mar. 23-27, Arles France, pp. 309-310.
Lincoln Global, Inc., "VRTEX 360: Virtual Reality Arc Welding Trainer" Brochure (2015) 4 pages.
Wuhan Onew Technology Co Ltd, "ONEW-360 Welding Training Simulator" http://en.onewtech.com/_d276479751.htm as accessed on Jul. 10, 2015, 14 pages.
The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.
Miller Electric Mfg Co, "LiveArc: Welding Performance Management System" Owner's Manual, (Jul. 2014) 64 pages.
Miller Electric Mfg Co, "LiveArc Welding Performance Management System" Brochure, (Dec. 2014) 4 pages.
Office action from U.S. Appl. No. 12/499,687 dated Mar. 6, 2014.
Office action from U.S. Appl. No. 12/499,687 dated Nov. 6, 2014.
Office action from U.S. Appl. No. 12/966,570 dated May 8, 2013.
Office action from U.S. Appl. No. 13/543,240 dated Nov. 14, 2014.
Office action from U.S. Appl. No. 14/444,173 dated Mar. 18, 2015.
Notice of Allowance from U.S. 13/543,240 dated Jun. 3, 2015.
Notice of Allowance from U.S. Appl. No. 14/444,173 dated Jun. 24, 2015.
Office action from U.S. Appl. No. 15/077,481 dated May 23, 2016.
Notice of Allowance from U.S. Appl. No. 15/077,481 dated Aug. 10, 2016.
Notice of Allowance from U.S. Appl. No. 15/077,481 dated Feb. 3, 2017.
Office Action from U.S. Appl. No. 14/190,812 dated Nov. 9, 2016.
Office Action from U.S. Appl. No. 14/190,812 dated Feb. 23, 2017.
Office Action from U.S. Appl. No. 15/077,532 dated Dec. 29, 2017.
Office Action from U.S. Appl. No. 14/293,700 dated Dec. 28, 2016.
Notice of Allowance from U.S. Appl. No. 14/293,700 dated May 10, 2017.
Office Action from U.S. Appl. No. 14/293,826 dated Dec. 30, 2016.
Office Action from U.S. Appl. No. 14/293,826 dated Jul. 21, 2017.
Office Action from U.S. Appl. No. 14/526,914 dated Feb 3. 2017.
Office Action from U.S. Appl. No. 14/526,914 dated Jun. 6, 2017.
Office Action from U.S. Appl. No. 14/552,739 dated Feb. 17, 2017.
Office Action from U.S. Appl. No. 14/615,637 dated Apr. 27, 2017.
Collins (Lecture 4:Smoothing) (downloaded from: https://web.archive.org/web/20150616212349/http://www.cse.psu.adu/-rtc12/CSE486/lecture04.pdf) (Year: 2015).
IT Media, "Tokyo Game Show 2008: Games aren't just about entertainment," published Oct. 9, 2008.
SIMFOR / CESOL, "RV-SOLD" Welding Simulator, Technical and Functional Features, 20 pages, date unknown.

(56) References Cited

OTHER PUBLICATIONS

International Search Report and Written Opinion from PCT/IB2009/006605 dated Feb. 12, 2010.
Robert Schoder, "Design and Implementation of a Video Sensor for Closed Loop Control of Back Bead Weld Puddle Width," Massachusetts, Institute of Technology, Dept of Mechanical Engineering, May 27, 1983, 64 pages.
Hills and Steele, Jr.; "Data Parallel Algorithms", Communications of the ACM, Dec. 1986, vol. 29, No. 12, p. 1170.
Nancy C. Porter, J. Allan Cote, Timothy D. Gifford, and Wim Lam, Virtual Reality Welder Training, 29 pages, dated Jul. 14, 2006.
J.Y. (Yosh) Mantinband, Hillel Goldenberg, Llan Kleinberger, Paul Kleinberger, Autosteroscopic, field-sequential display with full freedom of movement OR Let the display were the shutter-glasses, 3ality (Israel) Ltd., 8 pages, 2002.
Fronius, Ars Electronica Linz GMBH, High-speed video technology is applied to research on welding equipment, and the results are visualized in the CAVE, 2 pages, May 18, 1997.
D.K. Aidun and S.A. Martin, "Penetration in Spot GTA Welds during Centrifugation," Journal of Material Engineering and Performance vol. 7(5), 4 pages, Oct. 1998-597.
Arc+ simulator; httl://www.123arc.com/en/depliant_ang.pdf; 2 pages, 2000.
Glen Wade, "Human uses of ultrasound: ancient and modern", Ulrasonics vol. 38, 5 pages, dated 2000.
ASME Definitions, Consumables, Welding Positions, 4 pages, dated Mar. 19, 2001. See http://www.gowelding.com/asme4.htm.
M. Abbas, F. Waeckel, Code Aster (Software) EDF (France), 14 pages, Oct. 2001.
Achim Mahrle, Jurgen Schmidt, "The influence of fluid flow phenomena on the laser beam welding process"; International Journal of Heat and Fluid Flow 23, 10 pages, dated 2002.
The Lincoln Electric Company; CheckPoint Production Monitoring brochure; four (4) pages; http://www.lincolnelectric.com/assets/en_US/products/literature/s232.pdf; Publication S2.32; 4 pages, Issue Date Feb. 2012.
International Search Report and Written Opinion from PCT/US10/60129 dated Feb. 10, 2011.
Desroches, X.; Code-Aster, Note of use for aclculations of welding; Instruction manual U2.03 booklet: Thermomechincal; Document: U2.03.05; 13 pages, Oct. 1, 2003.
Fast, K. et al., "Virtual Training for Welding", Mixed and Augmented Reality, 2004, ISMAR 2004, Third IEEE and SM International Symposium on Arlington, VA, 2 pages, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric MFG Co.; MIG Welding System features weld monitoring software; NewsRoom 2010 (Dialog®File 992); © 2011 Dialog. 2010; http://www.dialogweb.com/cgi/dwclient?reg=133233430487; three (3) pages; printed Mar. 8, 2012.
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Abbas, M. et al..; Code_Aster; Introduction to Code_Aster; User Manual; Booklet U1.0-: Introduction to Code_Aster; Document: U1.02.00; Version 7.4; 14 pages, Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.
Nancy C. Porter, Edison Welding Institute; J. Allan Cote, General Dynamics Electric Boat; Timothy D. Gifford, VRSim; and Wim Lam, FCS Controls; Virtual Reality Welder Trainer, Session 5: Joining Technologies for Naval Applications, 16 pages, earliest date Jul. 14, 2006.
T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.
Ratnam and Khalid: "Automatic classification of weld defects using simulated data and an MLP neutral network." Insight vol. 49, No. 3; 6 pages, Mar. 2007.
Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.
CS Wave, The Virtual Welding Trainer, 6 pages, 2007.
asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 17 pages, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtually Welding, Training in a virtual environment gives welding students a leg up, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.
Choquet, Claude; "ARC+: Today's Virtual Reality Solution for Welders" Internet Page, 6 pages, Jan. 1, 2008.
Juan Vicenete Rosell Gonzales, "RV-Sold: simulator virtual para la formacion de soldadores"; Deformacion Metalica, Es. vol. 34, No. 301, 14 pages, Jan. 1, 2008.
White et al., Virtual welder training, 2009 IEEE Virtual Reality Conference, 1 page, p. 303, 2009.
Training in a virtual environment gives welding students a leg up, retrieved on Apr. 12, 2010 from: http://www.thefabricator.com/article/arcwelding/virtually-welding, 4 pages.
Sim Welder, Train better welders faster, retrieved on Apr. 12, 2010 from: http://www.simwelder.com.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; 2009; 18 pages; Sensors 2009, 9, 7753-7770; doi; 103390/s91007753.
Production Monitoring 2 brochure, four (4) pages, The Lincoln Electric Company, May 2009.
International Search Report and Written Opinion from PCT/IB10/02913 dated Apr. 19, 2011.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
J. Hu and Hi Tsai, Heat and mass transfer in gas metal arc welding. Part 1: the arc, found in ScienceDirect, International Journal of Heat and Mass Transfer 50 (2007), 14 pages, 833-846, available online on Oct. 24, 2006 http://www.web.mst.edu/~tsai/publications/HU-IJHMT-2007-1-60.pdf.
M. Ian Graham, Texture Mapping, Carnegie Mellon University Class 15-462 Computer Graphics, Lecture 10, 53 pages, dated Feb. 13, 2003.
Fujita et al., "Simulation Teaching Materials for the Mastery of Advanced Skills in Welding Torch Operation," IEICE Technical

(56) References Cited

OTHER PUBLICATIONS

Report vol. 104, No. 48, Institute of Electronics, Information and Communication Engineers (IEICE), May 7, 2004.
Russell and Norvig, "Artificial Intelligence: A Modem Approach", Prentice-Hall (Copyright 1995).
Mechanisms and Mechanical Devices Source Book, Chironis, Neil Sclater, McGraw Hill; 2nd Addition, 1996.
International Search Report and Written Opinion from PCT/US12/45776 dated Oct. 1, 2012.
Bender Shipbuilding and Repair Co. Virtual Welding—A Low Cost Virtual Reality Welding Training System. Proposal submitted pursuant to MSRP Advanced Shipbuilding Enterprise Research Announcement, Jan. 23, 2008. 28 pages, See also, http://www.nsrp.org/6-PresentationsM/D/020409 Virtual Welding Wilbur.pdf.
Aiteanu, Dorian; and Graser, Axel. "Generation and Rendering of a Virtual Welding Seam in an Augmented Reality Training Environment." Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.
Tschirner, Petra; Hillers, Bernd; and Graser, Axel "A Concept for the Application of Augmented Reality in Manual Gas Metal Arc Welding." Proceedings of the International Symposium on Mixed and Augmented Reality; 2 pages; 2002.
Penrod, Matt. "New Welder Training Tools." EWI PowerPoint presentation; 16 pages; allegedly 2008.
Fite-Georgel, Pierre. Is there a Reality in Industrial Augmented Reality?10th IEEE International Symposium on Mixed and Augmented Reality (ISMAR). 10 pages, allegedly 2011.
Hillers, B.; Graser, A. "Real time Arc-Welding Video Observation System." 62nd International Conference of IIW, Jul. 12-17, 2009, 5 pages, allegedly Singapore 2009.
Advance Program of American Welding Society Programs and Events. Nov. 11-14, 2007. 31 pages. Chicago.
Sandor, Christian; Gudrun Klinker. "PAARTI: Development of an Intelligent Welding Gun for BMW." PIA2003, 7 pages, Tokyo. 2003.
ARVIKA Forum Vorstellung Projekt PAARI. BMW Group Virtual Reality Center. 4 pages. Nuermberg. 2003.
Sandor, Christian; Klinker, Gudrun. "Lessons Learned in Designing Ubiquitous Augmented Reality User Interfaces." 21 gages, allegedly from Emerging Technologies of Augmented Reality: Interfaces Eds. Haller, M.; Billinghurst, M.; Thomas, B. Idea Group Inc. 2006.
Impact Welding: examples from current and archived website, trade shows, etc. See, e.g., http://www.impactwelding. .com. 53 pages.
http://www.nsrp.org/6-Presentations/WDVirtual_Welder.pdf (Virtual Reality Welder Training, Project No. SI051, Navy ManTech Program, Project Review for ShipTech 2005); 22 pages. Biloxi, MS.
https://app.aws_org/w/r/www/wj/2005/031WJ_2005_03.pdf (AWS Welding Journal, Mar. 2005 (see, e.g., p. 54)).; 114 pages.
https://app.aws.org/conferences/defense/live index.html (AWS Welding in the Defense Industry conference schedule, 2004); 12 pages.
https://app.aws.org/wj/2004/04/052/njc (AWS Virtual Reality Program to Train Welders for Shipbuilding, workshop information, 2004); 7 pages.
https://app.aws.org/wj/2007/11WJ200711.pdf (AWS Welding Journal, Nov. 2007); 240 pages.
American Welding Society, "Vision for Welding Industry;" 41 pages.
Energetics, Inc. "Welding Technology Roadmap," Sep. 2000, 38 pages.
Aiteanu, Dorian; and Graser, Axel. Computer-Aided Manual Welding Using an Augmented Reality Supervisor Sheet Metal Welding Conference XII, Livonia, MI, May 9-12, 2006, 14 pages.
Hillers, Bernd; Aiteanu, Darin and Graser, Axel "Augmented Reality—Helmet for the Manual Welding Process," Institute of Automation, University of Bremen, Germany; 21 pages.
Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003; 2 pages.
ArcSentry Weld Quality Monitoring System; Native American Technologies, allegedly 2002, 5 pages.
P/NA.3 Process Modelling and Optimization; Native American Technologies, allegedly 2002, 5 pages.
B. Hillers, D. Aitenau, P. Tschimer, M. Park, A. Graser, B. Balazs, L. Schmidt, "TEREBES: Welding Helmet with AR Capabilities", Institute of Automatic University Bremen; Institute of Industrial Engineering and Ergonomics, 10 pages, allegedly 2004.
Sheet Metal Welding Conference Xlr, American Welding Society Detroit Section, May 2006, 11 pages.
Kenneth Fast, Timothy Gifford, Robert Yancey, "Virtual Training for Welding", Proceedings of the Third IEEE and ACM International Symposium on Mixed and Augmented Reality (ISMAR 2004); 2 pages.
Amended Answer to Complaint with Exhibit A for Patent Infringement filed by *Seabery North America Inc. in Lincoln Electric Co. et al. v. Seabery Soluciones, S.L. et al.*, Case No. 1:15-cv-01575-DCN, filed Mar. 1, 2016, in the U.S. District Court for the Northern District of Ohio; 19 pages.
Amended Answer to Complaint with Exhibit A for Patent Infringement filed by *Seabery Soluciones SL in Lincoln Electric Co. et al. v. Seabery Soluciones, S.L_ et al.*, Case No. 1:15-cv-01575-DCN, filed Mar. 1, 2016, in the U.S. District Court for the Northern District of Ohio; 19 pages.
Reply to Amended Answer to Complaint for Patent Infringement filed by *Lincoln Electric Company; Lincoln Global, Inc. in Lincoln Electric Co. et al. v. Seabery Soluciones, S.L. et al.*, Case No. 1:15-cv-01575-DCN; filed Mar. 22, 2016; 5 pages.
Answer for Patent Infringement filed by *Lincoln Electric Company, Lincoln Global, Inc. in Lincoln Electric Co. et al. v. Seabery Soluciones, S.L. et al.*, Case No. 1:15-cv-01575-DCN; filed Mar. 22, 2016; 5 pages.
Petition for Inter Partes Review of U.S. Pat. No. 8,747,116; IPR 2016-00749; Apr. 7, 2016; 70 pages.
Petition for Inter Partes Review of U.S. Pat. No. RE45,398; IPR 2016-00840; Apr. 18, 2016; 71 pages.
Petition for Inter Partes Review of U.S. Pat. No. 9,293,056; IPR 2016-00904; May 9, 2016; 91 pages.
Petition for Inter Partes Review of U.S. Pat. No. 9,293,057; IPR 2016-00905; May 9, 2016; 87 pages.
http://www.vrsim.net/history, downloaded Feb. 26, 2016.
Complaint for Patent Infringement in *Lincoln Electric Co. et al. v. Seabery Soluciones, S.L. et al.*, Case No. 1:15-av-01575-DCN, filed Aug. 10, 2015, in the U.S. District Court for the Northern District of Ohio; 81 pages.
Kobayashi, Ishigame, and Kato, Simulator of Manual Metal Arc Welding with Haptic Display ("Kobayashi 2001"), Proc. of the 11th International Conf. on Artificial Reality and Telexistence (ICAT), Dec. 5-7, 2001, pp. 175-178, Tokyo, Japan.
Wahi, Maxwell, and Reaugh, "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Declaration of Dr. Michael Zyda, May 3, 2016, exhibit to IPR 2016-00749.
Declaration of Edward Bohnert, Apr. 27, 2016, exhibit to IPR 2016-00749.
Swantec corporate web page downloaded Apr. 19, 2016. httpl/www.swantec.com/technology/numerical-simulation/.
Catalina, Stefanescu, Sen, and Kaukler, Interaction of Porosity with a Planar Solid/Liquid Interface (Catalina),), Metallurgical and Materials Transactions, vol. 35A, May 2004, pp. 1525-1538.
Fletcher Yoder Opinion re U.S. Pat. No. RE45398 and U.S. Appl. No. 14/589,317; including appendices; Sep. 9, 2015; 1700 pages.
Kobayashi, Ishigame, and Kato, "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.

(56) References Cited

OTHER PUBLICATIONS

G.E. Moore, No exponential is forever: but Forever can be delayed!: IEEE International Solid-State Circuits Conference, 2003. 19 pages.
"High Performance Computer Architectures_ A Historical Perspective," downloaded May 5, 2016. http://homepages.inf.ed.ac.uk.cgi/mi/comparch. pl?Paru/perf.html,Paru/perf-f.html,Paru/menu-76.html; 3 pages.
Office Action from CN Application No. 201480060353.9 dated Sep. 12, 2018.
Office Action from U.S. Appl. No. 14/827,657 dated May 26, 2017.
Office Action from U.S. Appl. No. 14/827,657 dated Jan. 16, 2018.
Office Action from U.S. Appl. No. 15/228,524 dated Feb. 5, 2018.
Office Action from Chinese Application No. 201280075678.5 dated Jul. 5, 2016.
Office Action from Chinese Application No. 201480027306.4 dated Aug. 3, 2016.
Office Action from Chinese Application No. 201380017661.9 dated Aug. 22, 2016.
Office Action from Chinese Application No. 201480025359.2 dated Sep. 26, 2016.
Office Action from Chinese Application No. 201480025614.3 dated Nov. 28, 2016.
Office Action from Chinese Application No. 201480025359.2 dated Feb. 28, 2017.
Office Action from Chinese Application No. 201380076368.X dated Mar. 1, 2017.
Office Action from Chinese Application No. 201480025614.3 dated Jun. 9, 2017.
Office Action in CN Application No. 201480012861.X dated Jul. 18, 2017.
Office Action in CN Application No. 201610179195.X dated Jul. 19, 2017.
Office Action in CN Application No. 201480025985.1 dated Aug. 10, 2017.
Decision on Rejection in CN Application No. 201380047141.2 dated Sep. 7, 2017.
Office Action from U.S. Appl. No. 14/829,161 dated Jul. 28, 2017.
Notification of Reason for Refusal from KR Application No. 10-2015-7002697 dated Sep. 25, 2017.
Communication Pursuant to Article 94(3) EPC in EP Application No. 14732357.0 dated Feb. 12, 2018.
Office Action in JP Application No. 2015-562352 dated Feb. 6, 2018.
Office Action in JP Application No. 2015-562353 dated Feb. 6, 2018.
Office Action in JP Application No. 2015-562354 dated Feb. 6, 2018.
Office Action in JP Application No. 2015-562355 dated Feb. 6, 2018.
Office Action in CN Application No. 201710087175.4 dated Feb. 1, 2018.
Bargteil et al., "A Texture Synthesis Method for Liquid Animations," Eurographics/ ACM SIGGRAPH Symposium on Computer Animation, 2006, pp. 345-351.
Aidun, Daryush K "Influence of simulated high-g on the weld size of Al—Li-Alloy" Acta Astronautics, vol. 48, No. 2-3, pp. 153-156, 2001.
Boss (engineering), Wikipedia, 1 page, printed Feb. 6, 2014.
CS Wave, Product Description, 2 pages, printed Jan. 14, 2015.
EnergynTech Inc.; website printout; http://www.energyntech.com./; Advanced Metals Processing Technology & Flexible Automation for Manufacturing; Virtual Welder; Virtual training system for beginning welders; 2 page; 2014.
EnergynTech Inc.; website printout; http://www.energyntech.com/Zipper.html; Zipper Robot Performing a HiDep Weld; 1 page 2014.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
Fillet weld, Wikipedia, 3 pgs, printed Feb. 6, 2014.
Fronius, Virtual Welding, 8 pages, printed Jan. 14, 2015.
Fronius, Virtual Welding, The Welder Training of the Future, 8 page brochure, 2011.
The Goodheart-Wilcox Co. Inc., Weld Joints and Weld Types, Chaper 6; pp. 57-68; date unknown.
Kemppi ProTrainer, product data, 3 pages, printed Jan. 14, 2015.
Leap Motion, Inc., product information, copyright 2013, 14 pages.
Learning Labs, Inc., Seabery, Soldamatic Augmented Reality Welding Trainers, 4 pgs., printed Mar. 20, 2014.
Lim et al., "Automatic classification of weld defects using simulated data and MLP neural network", Insight, vol. 49, No. 3, Mar. 2007.
Narayan et al., "Computer Aided Design and Manufacturing," pp. 3-4, 14-15, 17-18, 92-95, and 99-100, Dec. 31, 2008.
NSRP—Virtual Welding—A Low Cost Virtual Reality Welder Training System—Phase II—Final Report; Feb. 29, 2012; Kenneth Fast, Jerry Jones, Valerie Rhoades; 53 pages.
Seabury Soluciones, SOLDAMATIC Welding Trainer Simulator, 30 pages, printed Jan. 14, 2015.
Terebes; Institute of Automation; University of Bremen; Project Motivation Problems Using Traditional Welding Masks; 2 page ; 2015.
Weld nut, Wikipedia, 2 pgs, printed Feb. 6, 2014.
Weldplus, Welding Simulator, 2 pages, printed Jan. 14, 2015.
WeldWatch Software/Visible Welding; website printout; http://visiblewelding.com/weldwatch-software/; 4 pages; 2015.
Exhibit B from Declaration of *Morgan Lincoln in Lincoln Electric Co. et al.* v. *Seabery Soluciones, S.L. et al.*, Case No. 1:15-cv-01575-DCN, dated Dec. 20, 2016, 5 pages.
Adams et., "Adaptively Sampled Particle Fluids," ACM Transactions on Graphics, vol. 26, No. 3, Article 48, Jul. 2007, pp. 48.1-487.
Notice of Allowance from U.S. Appl. No. 15/077,532 dated Mar. 28, 2018.
Office Action from CN Application No. 201910995279.4 dated Mar. 1, 2021.

* cited by examiner

VIRTUAL REALITY AND REAL WELDING TRAINING SYSTEM AND METHOD

RELATED APPLICATIONS

This application is a continuation of U.S. application Ser. No. 14/526,914 filed on Oct. 29, 2014, which claims priority under 35 U.S.C. § 119(e) from U.S. Provisional Patent Application No. 61/900,136 filed on Nov. 5, 2013, the entire disclosures of each of which are herein incorporated by reference.

FIELD

The present invention relates to the art of welding station simulation and more particularly to a virtual sequencer that simulates semi-automatic welding of complex assemblies.

BACKGROUND

Learning how to perform all of the steps required in a welding station, including the steps that are in addition to welding, traditionally takes many hours of instruction, training, and practice.

There are many different types of operations that can be learned, including various welding and non-welding operations. Typically, the steps of a welding station are learned by a student operator at a real welding station performing welding operations on real metal pieces. Such real-world training can tie up scarce welding resources and use up limited welding materials. Training while welding on real production parts can be costly as an operator learns the assembly operation. Training time on real production parts typically requires two operators (costly) and potentially generates scrap, rework, or low quality assemblies.

Recently, however, the idea of training using welding simulations has become more popular. Some welding simulations are implemented via personal computers, on-line via the Internet, or even as virtual welders. However, conventional welding simulations tend to be limited to single welds in their training focus and typically involve one welding technique at a time. Conventional virtual reality training generally only involves individual welds and does not prepare, or train, the operator how to produce a complete assembly that involves multiple welding and/or assembly steps. In practice, unlike in these simulators, there are many different welding techniques and non-welding operations required at a welding station that are needed to create an entire, complete welded assembly. Thus, there is an unmet need for welding simulation systems and methods that can effectively simulate the production of complete assemblies.

SUMMARY

The general inventive concepts encompass virtual welding systems (and related methods), including the illustrative systems and methods disclosed and suggested herein.

In one exemplary embodiment, a virtual welding system comprises: a logic processor based subsystem operable to execute coded instructions for generating an interactive welding environment that emulates welding activity on a virtual weld joint defined by at least one of a welding coupon and a sample part; a virtual sequence controller operatively connected to the logic processor based subsystem for implementing a virtual sequence; displaying means operatively connected to the logic processor based subsystem for visually depicting the interactive welding environment including the virtual weld joint; an input device for performing virtual welding activity on the virtual weld joint in real time; and a spatial tracker comprising one or more sensors adapted to track movement of the input device in real time for communicating data about the movement of the input device to the logic processor based subsystem.

In one exemplary embodiment, the virtual welding system further comprises a user interface for a user to provide input to the virtual welding system.

In one exemplary embodiment, the logic processor based subsystem is housed within a simulated welding console that is sized and shaped to approximate a welding power source.

In one exemplary embodiment, the logic processor based subsystem implements the virtual sequence controller.

In one exemplary embodiment, the virtual sequence controller comprises a microprocessor, a sequence control program, and a memory. The memory stores one or more state table files.

In one exemplary embodiment, the virtual welding system further comprises a virtual sequence configuration tool. The virtual sequence configuration tool allows a user to modify one of the existing state table files. The virtual sequence configuration tool allows a user to create a new state table file, for storing in the memory.

In one exemplary embodiment, the virtual sequence is defined by at least one of the state table files.

In one exemplary embodiment, a user selects one of the state table files based on a task to be performed. In one exemplary embodiment, the task is production of a complete virtual assembly.

In one exemplary embodiment, the virtual sequence includes a plurality of operations to be performed in order, each operation intended to achieve a particular state.

In one exemplary embodiment, at least one of the operations is a manual operation to be performed by the user. In one exemplary embodiment, the manual operation is one of providing user information, retrieving a part, providing part information, placing a part, securing a part, and providing assembly information.

In one exemplary embodiment, the virtual welding system further comprises a virtual sequence display means. The virtual sequence display means displays information on the manual operation.

In one exemplary embodiment, at least one of the operations is an automatic operation to be performed by the virtual welding system. In one exemplary embodiment, the automatic operation is one of specifying a weld process, specifying a gas type, specifying a gas flow rate, specifying a stick electrode type, specifying a flux cored wire type, specifying a wire feed speed, specifying a voltage level, specifying an amperage, specifying a polarity, and specifying a background environment for the interactive welding environment.

In one exemplary embodiment, at least one of the operations is a manual operation to be performed by the user; and at least one of the operations is an automatic operation to be performed by the virtual welding system.

In one exemplary embodiment, each state is associated with a condition. In one exemplary embodiment, the sequence controller performs an action if the condition is not met. In one exemplary embodiment, the action is waiting a predetermined duration. In one exemplary embodiment, the action is repeating the operation for the state. In one exemplary embodiment, the action is restarting the virtual sequence.

In one exemplary embodiment, the virtual sequence includes a simulated function selected from the group consisting of: a Quality Check function, a Repeat function, a Notify Welder function, an Enter Job function, a Job Report function, a System Check function, a Perform Welding Operation function, and combinations thereof.

In one exemplary embodiment, the displaying means comprises an LCD screen.

In one exemplary embodiment, the displaying means is a face-mounted display. In one exemplary embodiment, the face-mounted display is integrated in a welding helmet. In one exemplary embodiment, the welding helmet includes at least one speaker.

In one exemplary embodiment, the displaying means comprises a first display and a second display. The first display is a face-mounted display, while the second display is not a face-mounted display.

In one exemplary embodiment, the first display and the second display are operable to present different views of the interactive welding environment (at the same time).

In one exemplary embodiment, the displaying means is operable to communicate over a network. In one exemplary embodiment, the network is a wireless network.

In one exemplary embodiment, the input device is a mock welding tool.

In one exemplary embodiment, the input device is operable to communicate over a network. In one exemplary embodiment, the network is a wireless network.

In one exemplary embodiment, the spatial tracker generates a magnetic field. The spatial tracker is operable to determine the location of the one or more sensors within the magnetic field.

In one exemplary embodiment, the virtual welding system further comprises a support structure.

In one exemplary embodiment, the support structure is a stand. In one exemplary embodiment, the stand comprises a base, a vertical post, an adjustable table, and an adjustable arm. In one exemplary embodiment, the welding coupon is operable to be attached to the stand. In one exemplary embodiment, at least one clamp is used to attach the welding coupon to the stand.

In one exemplary embodiment, the support structure is an assembly fixture. In one exemplary embodiment, the assembly fixture holds the sample part.

In one exemplary embodiment, the virtual welding system further comprises means for collecting and storing welding and operational data from the virtual sequence controller.

In one exemplary embodiment, the virtual welding system further comprises means for assigning a quality score to the virtual welding activity.

BRIEF DESCRIPTION OF THE DRAWINGS

In the accompanying drawings, which are incorporated in and constitute a part of the specification, various exemplary embodiments of the invention are illustrated, which, together with a general summary of the invention given above and the detailed description given below, serve to exemplify embodiments of this invention.

DETAILED DESCRIPTION

Figure 1:
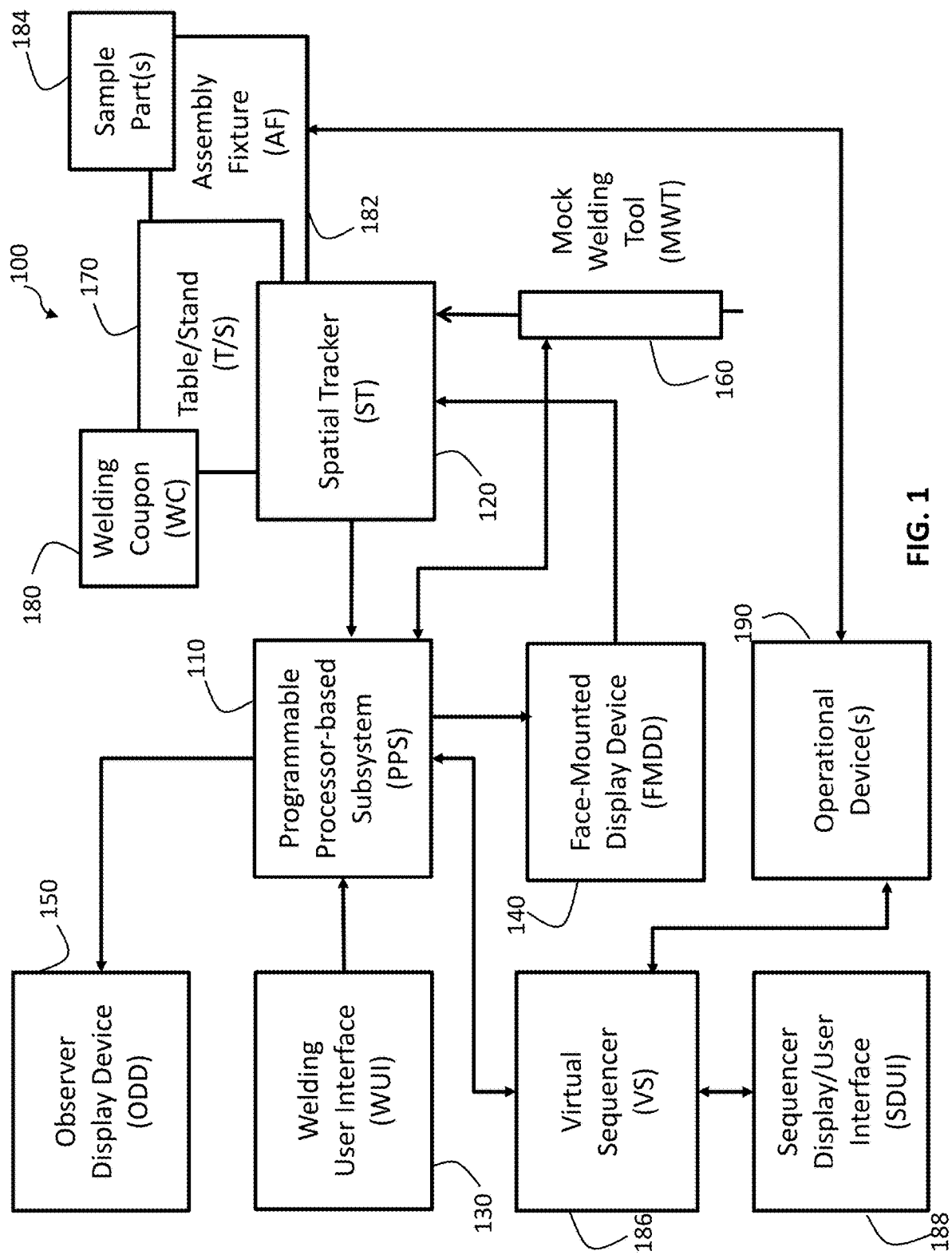
FIG. 1 is a block diagram that illustrates a system providing arc welding training in a real-time virtual reality environment, according to an exemplary embodiment.

In an exemplary embodiment, a virtual (simulated) weld station includes a virtual welding job sequencer. The virtual welding job sequencer simulates a real-world welding job sequencer (e.g., Lincoln Electric's Weld Sequencer) in a virtual environment or using one or more virtual components, such as a virtual welder. A real-world welding job sequencer can control the operations of a semi-automatic work cell, including instructing the operator on what to do next and automatically changing certain parameters of the welding cell, including, for example, welding parameters. The real-world welding job sequencer can provide the operator with an array of commands and instructions that relate to welding and non-welding aspects of the operations associated with the welding station.

A virtual welding station, including the virtual sequencer, can include Lincoln Electric's VRTEX® (virtual reality arc welding training machine) and Weld Sequencer technologies integrated into the virtual welding station to create a unique training/testing environment. In the virtual welding station, a welding sequence is used with the VRTEX system for virtual reality training to produce a given assembly. This requires a series of virtual welds on a virtual assembly, which trains the operator on the welding processes, operations, and procedures required to produce a real assembly (individual welds plus complete work instructions). Once the virtual training has been completed, an operator will be prepared for the real-world welding processes and the sequence of events required to create a real assembly. After training with the Virtual Sequencer, the operator now uses the Weld Sequencer to produce real assemblies, and the same welding sequence is repeated. Real welding operations are controlled and monitored by the Weld Sequencer while WeldScore is used to monitor the welding processes. The WeldScore monitor includes, but is not limited to, the embodiments disclosed in U.S. Ser. No. 12/775,729 filed May 7, 2010, now U.S. Pat. No. 8,569,646, which is incorporated herein by reference in its entirety.

In an exemplary embodiment, all training data (from VRTEX and Weld Sequencer) is collected in a production monitoring system. Comprehensive lesson plans (with virtual assembly creation and real assembly creation) are supplied with this technology. This includes a common welding sequence that is used in the virtual (VRTEX) environment and the real Weld Sequencer controller along with a kit of parts for the real welding portion of the training. The final outcome of an individual lesson is a complete report of all training welds/operations, assembly cycle time, and a real part from the kit.

The operational sequence (used in both the virtual and real-world environments) can contain validation checks on parameters like part placement, travel speed (welding duration), average amperage, and other welding variables. Use of these common requirements reinforces the real requirements that are first learned in the virtual weld station and then repeated on real assemblies (while the Virtual Sequencer and Weld Sequencer direct and monitor the operations in the same manner, respectively).

Successful completion of the virtual training may include an overall score for all welding operations, total cycle time limits, total arc time limits, number of arc starts/stops, and other welding variables. Once minimum requirements are achieved (e.g., once a performance score reaches a predetermined threshold), an operator would be approved for the next training step involving real welding.

During real welding, the Weld Sequencer will use the same welding sequence with the same requirements as the Virtual Sequencer for successfully completing a real assembly.

Welding and operational data from the Virtual Sequencer and Weld Sequencer operations can be collected in a common production monitoring system (e.g., CheckPoint). Data can be summarized by operator, welding operations (virtual and real), number of assemblies created, quality scores, cycle time metrics, etc.

In an exemplary embodiment, as with a real-world sequencer, a virtual sequencer can automatically select and implement functions of a virtual welding work cell. For example, a function could include a particular virtual weld schedule to be used within the virtual work cell. In other words, the virtual sequencer can select a virtual weld schedule to be used for a particular virtual weld, and modify the settings of the virtual work cell in accordance with the selected virtual weld schedule, automatically for the operator (i.e., without the operator's specific intervention).

Additionally, in the exemplary embodiment, the virtual sequencer may automatically indicate a sequence of operations, steps or different welds that the operator should follow to create a final virtual assembly. In conjunction with the automatic selection of virtual welding schedules, this indicated sequence allows an operator to follow the sequence to create a final virtual assembly, just like the operator would be expected to do in the real world weld station.

Accordingly, since the virtual sequencer sets up the virtual welding equipment and organizes the workflow, just like a real-world sequencer, the virtual sequencer can be used to train operators before they begin to operate in a real-world welding cell or station. In this manner, the chance for error in the real-world welding station is greatly reduced and productivity and quality are improved.

In an exemplary embodiment, a virtual reality welding station (VRWS) comprises a programmable processor-based subsystem, a spatial tracker operatively connected to the programmable processor-based subsystem, at least one mock welding tool capable of being spatially tracked by the spatial tracker, and at least one display device operatively connected to the programmable processor-based subsystem. The VRWS is capable of simulating, in a virtual reality space, operations associated with a real-world welding station. The operations can include various different types of welds and non-welding operations. For welding operations, the VRWS is capable of displaying the simulated weld puddle on the display device in real-time. As used herein, the term "real-time" means perceiving and experiencing in time in a simulated environment in the same way that a user would perceive and experience in a real-world welding scenario. For non-welding operations, such as, for example, operator identification entering/scanning, part identification entering/scanning, part fixturing, fixture manipulation/control, inspections, etc., the system is capable of replicating and/or simulating the steps that the operator needs to complete for the welding operation at a particular welding station. Generally, the VRWS may include any or all of the features and capabilities disclosed in the following patent applications, each of which is incorporated herein by reference in its entirety: U.S. Ser. No. 11/227,349 filed Sep. 15, 2005, now U.S. Pat. No. 8,692,157; U.S. Ser. No. 11/613, 652 filed Dec. 20, 2006; U.S. Ser. No. 12/501,257 filed Jul. 10, 2009, now U.S. Pat. No. 8,747,116; U.S. Ser. No. 12/501,263 filed Jul. 10, 2009; U.S. Ser. No. 12/504,870 filed Jul. 17, 2009; U.S. Ser. No. 12/719,053 filed Mar. 8, 2010, now U.S. Pat. No. 8,274,013; U.S. Ser. No. 13/081, 725 filed Apr. 7, 2011, now U.S. Pat. No. 8,657,605; U.S. Ser. No. 13/364,489 filed Feb. 2, 2012; U.S. Ser. No. 13/720,300 filed Dec. 19, 2012, now U.S. Pat. No. 8,787, 051; U.S. Ser. No. 13/792,288 filed Mar. 11, 2013, now U.S. Pat. No. 8,834,168; U.S. Ser. No. 13/792,309 filed Mar. 11, 2013; U.S. Ser. No. 13/792,294 filed Mar. 11, 2013, now U.S. Pat. No. 8,851,896; U.S. Ser. No. 13/792,280 filed Mar. 11, 2013; and U.S. Ser. No. 13/545,058 filed Jul. 10, 2012.

Referring now to the drawings, which are provided for the purpose of illustrating the various exemplary embodiments disclosed or otherwise suggested herein and not for the purpose of limiting same, FIG. 1 illustrates an exemplary embodiment of a system block diagram of a system 100 for providing welding station training in a real-time virtual reality environment. The system 100 includes a programmable processor-based subsystem (PPS) 110. The system 100 further includes a spatial tracker (ST) 120 operatively connected to the PPS 110. The system 100 also includes a physical welding user interface (WUI) 130 operatively connected to the PPS 110 and a face-mounted display device (FMDD) 140 operatively connected to the PPS 110 and the ST 120. The system 100 may also include an observer display device (ODD) 150 operatively connected to the PPS 110. The system 100 also includes at least one mock welding tool (MWT) 160 operatively connected to the ST 120 and the PPS 110. The system 100 may include a table/stand (T/S) 170. The system 100 may also include at least one welding coupon (WC) 180 capable of being attached to the T/S 170. The system 100 may include an assembly fixture (AF) 182. The system 100 may also include at least one sample part (SP) 184. The system 100 also includes a virtual sequencer (VS) 186 and a sequencer display/user interface (SDUI) 188. In other exemplary embodiments, the VS 186 may be combined with the PPS 110 and/or the SDUI 188 may be combined with the WUI 130 and/or other interfaces, displays, etc., to simulate the number and type of interfaces and/or displays that the station operator will be required to interact with in the real-world welding station.

The system 100 may also include various other devices, such as, for example, operational devices 190, that simulate the real-world welding station devices needed for certain operations. As shown in FIG. 1, an operational device 190 may be associated with the AF 182, for example, to verify SP 184 placement within the AF 182, manipulate the position of the AF 182, actuate one or more clamps to hold the SP 184 in the AF 182, etc. Other devices (not shown) may include, for example, scanners, readers, user interfaces, displays (including, e.g., configurable visual aids), visual/audible indicators (e.g., for sequence error, weld out-of-limits, WeldScore defect detection), PLC interfaces, interlocks (e.g., preheat and/or interpass temperature, position of automatic positioners, part detection/part loaded, clamps closed/open), control panels, assembly tools, inspection tools, operator position sensors (e.g., weight-sensing mat), part position/proximity sensors, safety/lock-out devices, lighting control, material handling devices, part and/or assembly gauges (e.g., for quality control), etc. In accordance with other exemplary embodiments, a mock gas bottle is provided (not shown) simulating a source of shielding gas and having an adjustable flow regulator. Some of the above elements of the system 100 may be real-world components that are used in the virtual weld station. For example, a real-world assembly fixture 182 may be used to hold the sample part 184. Any combination of virtual and real-world components may comprise the virtual weld station.

Figure 2:
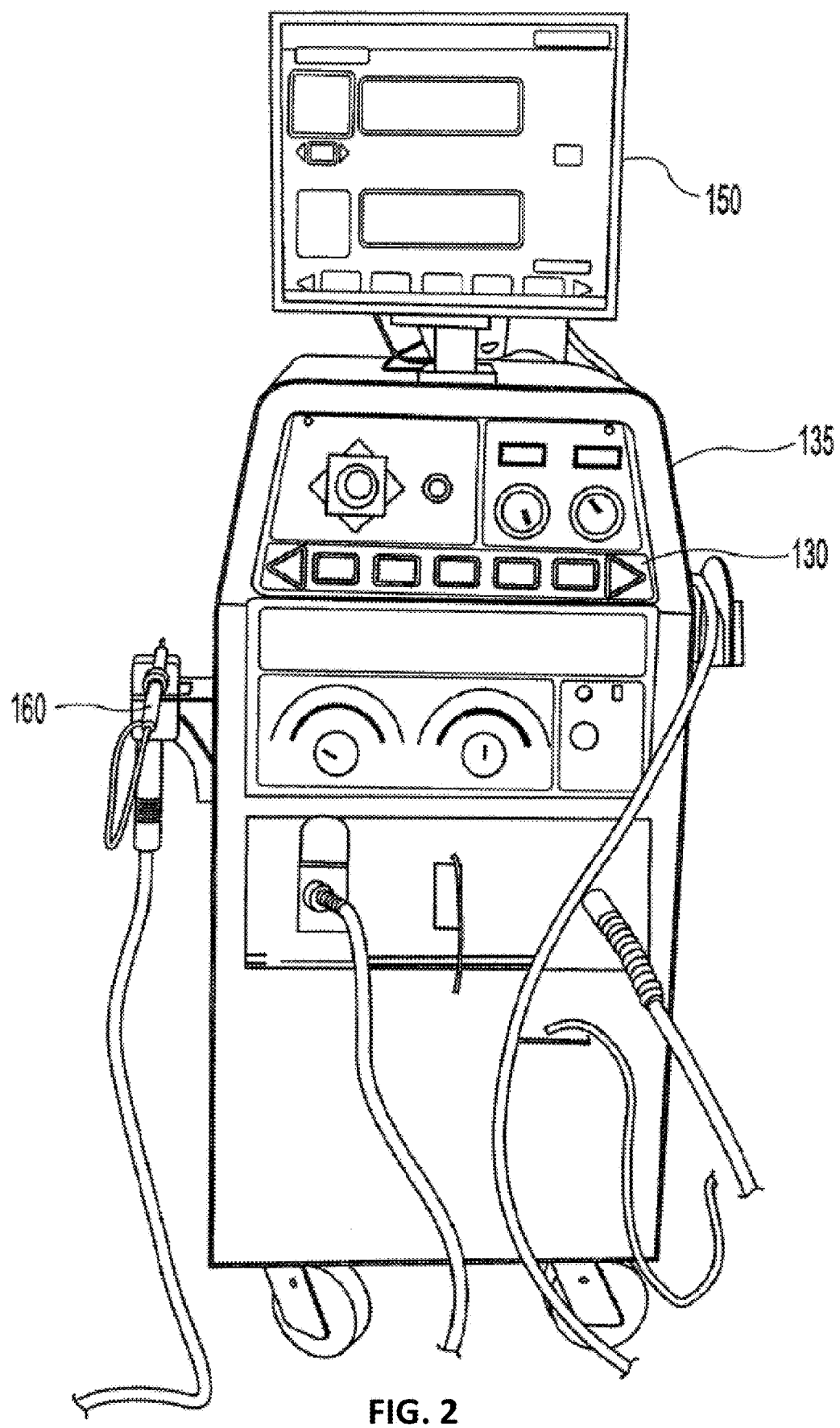
FIG. 2 is a block diagram that illustrates a simulated welding console and observer display device (ODD) of the system of FIG. 1, according to an exemplary embodiment.

FIG. 2 illustrates an exemplary embodiment of a simulated welding console 135 (simulating a welding power source user interface) with an observer display device (ODD) 150 of the system 100 of FIG. 1. The physical WUI 130 resides on a front portion of the console 135 and provides knobs, buttons, and a joystick for user selection of various modes and functions. The optional ODD 150 is attached to a top portion of the console 135. The MWT 160 rests in a holder attached to a side portion of the console 135. Internally, the console 135 can hold, or otherwise house, various components of the system 100, for example, the PPS 110, VS 186, and/or a portion of the ST 120.

Figure 3:
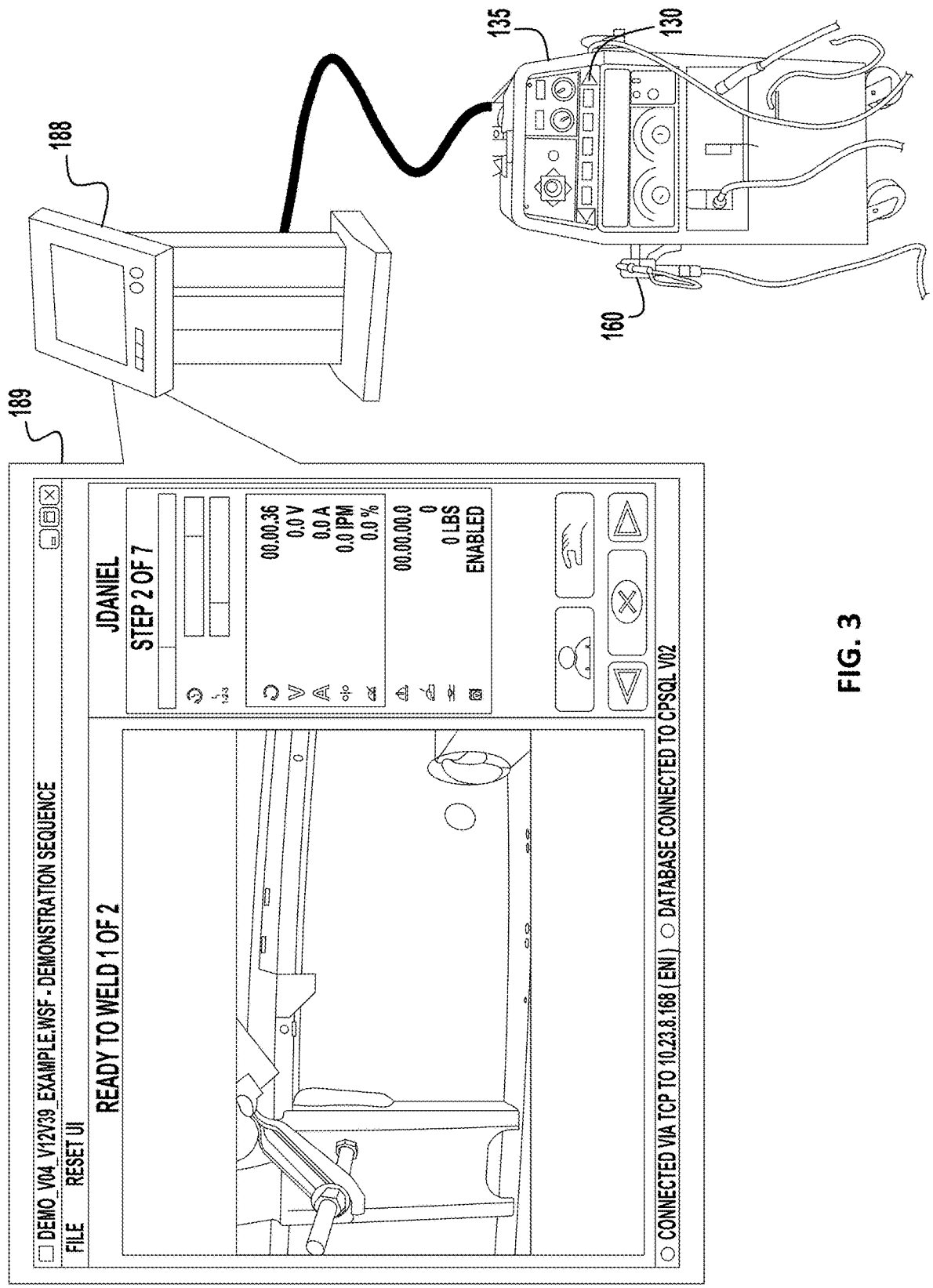
FIG. 3 is a diagram that illustrates a simulated welding console and sequencer display/user interface (SDUI) of the system of FIG. 1, according to an exemplary embodiment.

FIG. 3 illustrates an exemplary embodiment of a simulated welding console 135 (simulating a welding power source user interface) and a SDUI 188 of the system 100 of FIG. 1. A zoomed-in view of an exemplary screenshot 189 of the SDUI 188 is also shown. The physical SDUI 188 can provide a display screen, knobs, buttons, and/or a joystick for user selection of various modes and functions. The VS 186 may be integrated with the SDUI 188 or may be included with the PPS 110, which may be included in the console 135.

Figure 4:
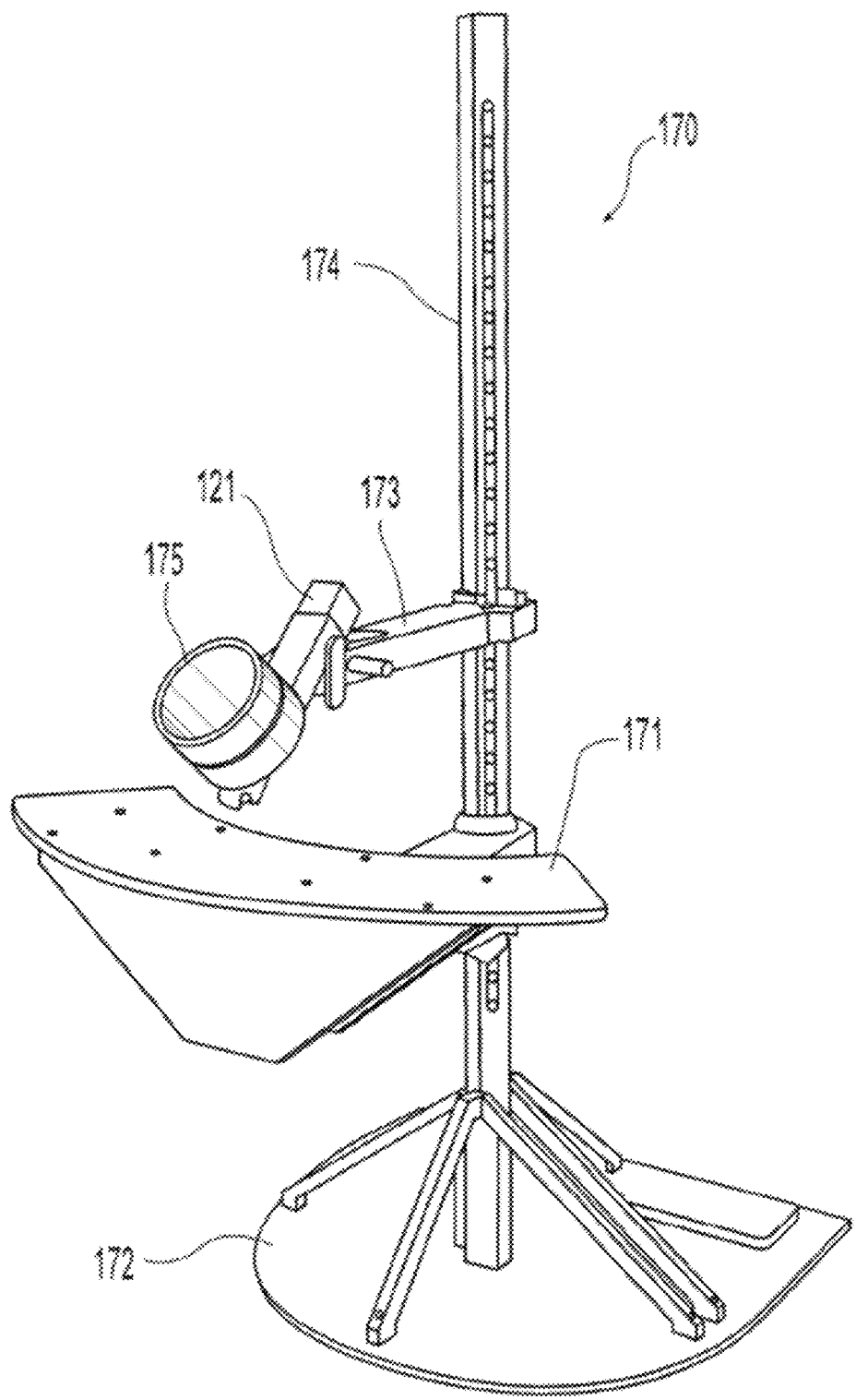
FIG. 4 is a diagram that illustrates a table/stand (T/S) of the system of FIG. 1, according to an exemplary embodiment.

FIG. 4 illustrates an exemplary embodiment of a table/stand (T/S) 170 of the system 100 of FIG. 1. The T/S 170 includes an adjustable table 171, a stand or base 172, an adjustable arm 173, and a vertical post 174. The table 171, the stand 172, and the arm 173 are each attached to the vertical post 174. The table 171 and the arm 173 are each capable of being manually adjusted upward, downward, and rotationally with respect to the vertical post 174. The arm 173 is used to hold various welding coupons (e.g., welding coupon 175) and/or sample parts 184, and a user may rest his/her arm on the table 171 when training. The vertical post 174 is indexed with position information such that a user may know exactly where the arm 173 and the table 171 are vertically positioned on the post 174. This vertical position information may be entered into the system by a user using the WUI 130, the ODD 150, and/or the SDUI 188.

Figure 5:
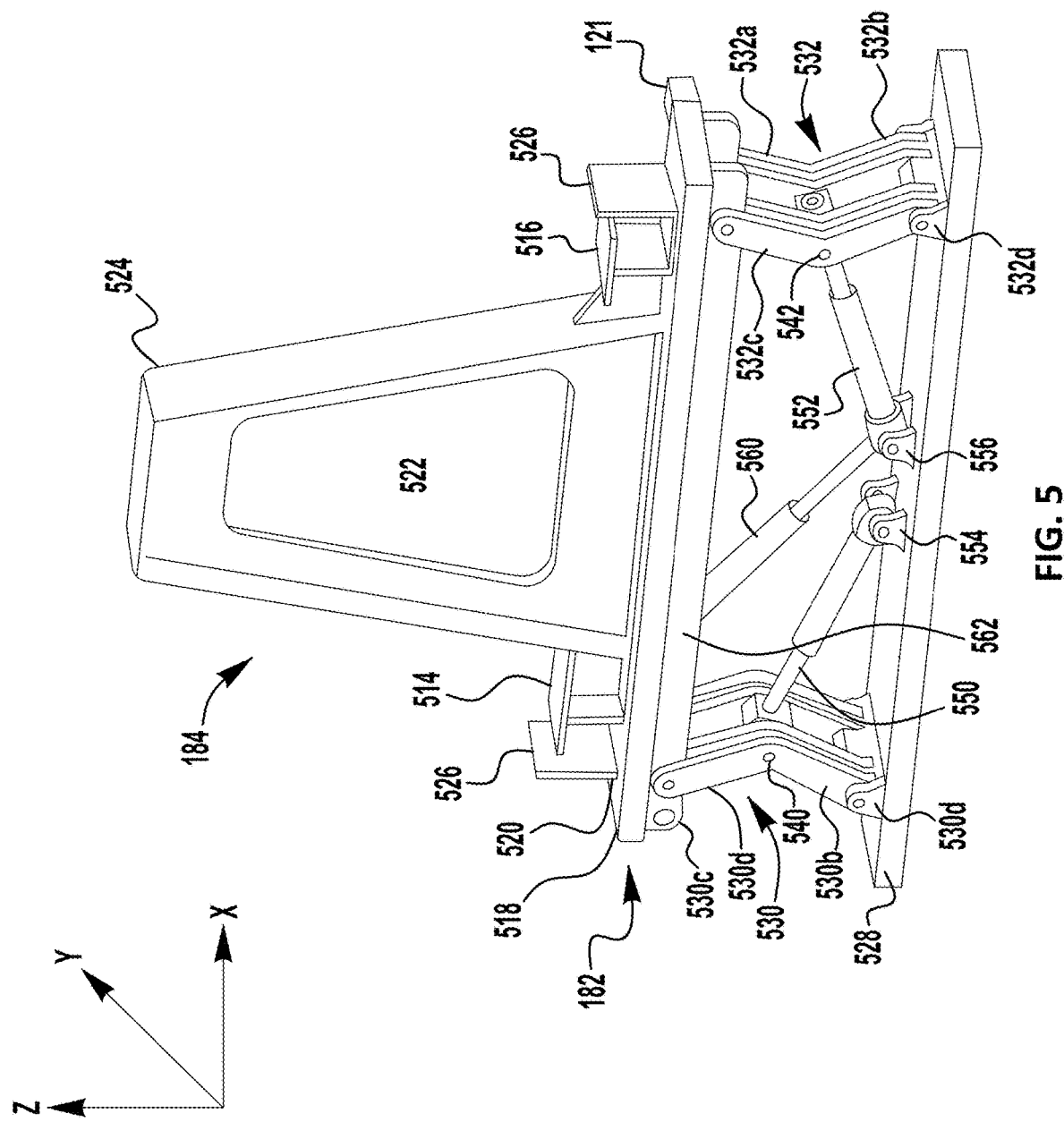
FIG. 5 is a drawing that illustrates a sample part (weldment) in an assembly fixture of the system of FIG. 1, according to an exemplary embodiment.

FIG. 5 illustrates an exemplary assembly fixture (AF) 182, shown as a single adjustable support structure. The support structure is depicted holding (i.e., supporting) a sample part (SP) 184, i.e., a weldment having spaced rails 514, 516. The support structure 182 includes an upper movable platform 518, on which is held a top surface 520 of the weldment 184. Movable platform 518 is adjusted to a desired position or orientation, for a particular area of the weldment 184 for simulated welding. The weldment 184 is boxed around frame 522 by elongated strips 524 (only short pieces of which are shown in FIG. 5). Top surface 520 of weldment 184 is the upper side of the rail section when incorporated into the rail system. Brace structures 526 are at spaced positions along the length of weldment 184. As illustrated in this figure, brace structures 526 are positioned to have rails 514, 516 positioned between the braces 526 and outer portions of frame 522 of weldment 184. With further attention to the support structure 182, a lower fixed support base 528 is in operable connection with movable upper platform 518 through transversely spaced multi-positionable hinges 530, 532. In one embodiment, the multi-positionable hinges may be 2-bar linkages, and the following discussion primarily refers to components or elements 530, 532 as 2-bar linkages. It is, however, to be appreciated that other hinges or other appropriate structures which permit suitable movement of movable platform 518 may be used without departing from the scope and intent of the general inventive concepts. The moveable platform 518 may be controlled by an operational device 190 from the system 100 of FIG. 1. In addition, the support structure 182 (as the AF) and the weldment 184 (as the SP), as depicted in FIG. 5, are merely exemplary. The AF 182 and the SP 184 may consist of any shape, construction, number of parts, type of parts, and size of parts as required for any welding operation.

As mentioned, the support structure 182 may be adjusted to locate the weldment 184 to an orientation or position appropriate for a desired simulated welding operation. To adjust the position of movable upper platform 518 with respect to fixed support base 528, actuators, such as length adjusting members 550, 552, are connected between pintles or pivot elements 540, 542 and pintles or pivot elements 554 and 556, respectively, the latter of which are positioned generally near the center of fixed base 528. In addition, an actuator, such as length adjusting member 560, is connected between fixed support base 528 via pintle or pivot element 556 and pintle or pivot element 562 to movable platform 518. Positioning of length adjusting members 550, 552, and 560 determine the position of movable platform 518 and therefore the location of weldment 184 being carried thereon. Pivot elements 530c, 532c, 530d, 532d, 540, 542, 554, 556, and 562 provide the support structure 182 with 3-degrees of freedom, i.e., capable of moving in the x and z directions, as well as tilting in the x-z plane. The physical size and operational characteristics of the individual length adjusting members 550, 552, 560 act to determine the envelope of motion for the support structure 182. While in one exemplary embodiment, the length adjusting members are hydraulic actuators, they may also represent other actuators such as pneumatic, ball-and-screw actuators, and/or any type of electrically controlled actuators. Any or all of these movable components may be controlled by one or more operational devices 190 from the system 100 of FIG. 1.

Other exemplary embodiments may include any combination of one or more of tables 171, arms 173, assembly fixtures 182, coupons 180, and/or sample parts 184 to best simulate the real-world weld station operations being simulated.

In accordance with other exemplary embodiments, the positions of the table 171, the arm 173, and/or the AF 182 may be automatically set by the PSS 110 and/or the VS 186 via preprogrammed settings, or via the WUI 130, the ODD 150, and/or the SDUI 188 as commanded by a user. In such embodiments, the T/S 170 and/or AF 182 typically includes, for example, motors and/or servo-mechanisms, and signal commands from the devices mentioned above activate the motors and/or servo-mechanisms.

In accordance with further exemplary embodiments, the positions of the table 171, the arm 173, the AF 182, the WC 180, and/or the SP 184 are detected by the system 100. In this way, a user does not have to manually input the position information via a user interface. In such embodiments, the T/S 170 and/or the AF 182 include position and orientation detectors and send signal commands to the PPS 110 and/or the VS 186 to provide position and orientation information. The WC 175 and/or the SP 184 may include position detecting sensors (e.g., coiled sensors for detecting magnetic fields). A user is able to see a rendering of the T/S 170 and/or the AF 182 on the ODD 150, the FMDD 140, and/or the SDUI 188 as the adjustment parameters are changed, in accordance with an exemplary embodiment.

In accordance with further exemplary embodiments, the positions of the table 171, the arm 173, the AF 182, the WC 180, and/or the SP 184 are dictated and monitored by the system 100. In various exemplary embodiments, positions of the table 171, the arm 173, the AF 182, the WC 180, and/or the SP 184 may be controlled by operational devices 190 based on commands from the PPS 110 and/or the VS 186. In other exemplary embodiments, a user may be provided with the position information via a user interface and manually position the table 171, the arm 173, the AF 182, the WC 180, and/or the SP 184. Automatic and manual positioning determinations are made based on the real-world weld station operations being simulated.

Various other operational devices 190 may be included in the VRWS in order to simulate the real-world welding station. Control and communication with these devices is designed to mimic the real-world welding environment, using virtual and/or real-world devices and components, similar to the exemplary AF 182 described herein.

Figure 6:
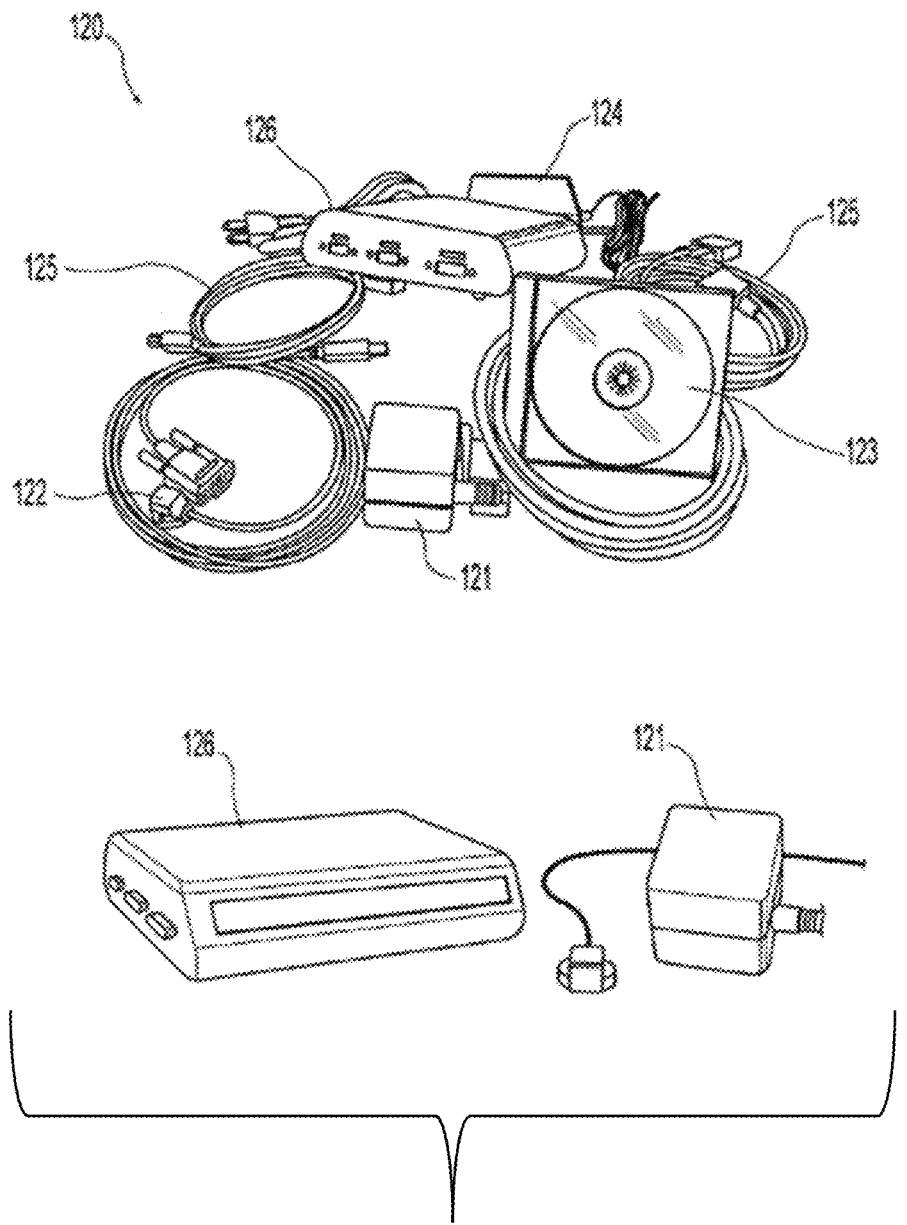
FIG. 6 is a drawing that illustrates various elements of the spatial tracker (ST) of FIG. 1, according to an exemplary embodiment.

FIG. 6 illustrates various elements of an exemplary embodiment of the spatial tracker (ST) 120 of FIG. 1. The ST 120 is a magnetic tracker that is capable of operatively interfacing with the PPS 110 of the system 100. The ST 120 includes a magnetic source 121 and source cable, at least one sensor 122 and associated cable, host software on disk 123, a power source 124 and associated cable, USB and RS-232 cables 125, and a processor tracking unit 126. The magnetic source 121 is capable of being operatively connected to, or otherwise interfaced with, the processor tracking unit 126 (e.g., via a cable). The sensor 122 is capable of being operatively connected to, or otherwise interfaced with, the processor tracking unit 126 (e.g., via a cable). The power source 124 is capable of being operatively connected to, or otherwise interfaced with, the processor tracking unit 126 (e.g., via a cable). The processor tracking unit 126 is capable of being operatively connected to, or otherwise interfaced with, the PPS 110 via a USB or RS-232 cable 125. The host software on disk 123 is capable of being loaded onto the PPS 110 and allows functional communication between the ST 120 and the PPS 110.

As shown in FIG. 4, the magnetic source 121 of the ST 120 is mounted on, or otherwise interfaced with, a first portion of the arm 173. Referring to FIG. 5, the magnetic source 121 of the ST 120 is mounted on, or otherwise interfaced with, the back portion of the upper platform 18. In other exemplary embodiments, multiple magnetic sources 121 are mounted in various locations and may be used to provide proper tracking. The magnetic source 121 creates a magnetic field around the magnetic source 121, including the space encompassing the WC 175 and/or the SP 184, which establishes a 3D spatial frame of reference. The T/S 170 and/or the assembly fixture 182 may be largely non-metallic (non-ferric and non-conductive) so as not to distort the magnetic field created by the magnetic source 121. The sensor 122 can include three induction coils orthogonally aligned along three spatial directions. The induction coils of the sensor 122 can each measure the strength of the magnetic field in each of the three directions and provide that information to the processor tracking unit 126. As a result, the system 100 is able to know where any portion of the WC 175 and/or the SP 184 is with respect to the 3D spatial frame of reference established by the magnetic field. The sensor 122 may be attached to the MWT 160 or the FMDD 140, allowing the MWT 160 or the FMDD 140 to be tracked by the ST 120 with respect to the 3D spatial frame of reference in both space and orientation. When two sensors 122 are provided and operatively connected to the processor tracking unit 126, both the MWT 160 and the FMDD 140 may be tracked. In this manner, the system 100 is capable of creating a virtual WC, a virtual SP, a virtual MWT, a virtual T/S, and/or a virtual AF in virtual reality space and displaying the virtual WC, the virtual SP, the virtual MWT, the virtual T/S, and/or the virtual AF on the FMDD 140, the ODD 150, and/or the SDUI 188 as the MWT 160 and the FMDD 140 are tracked with respect to the 3D spatial frame of reference.

In accordance with another exemplary embodiment, the sensor(s) 122 may wirelessly interface to the processor tracking unit 126, and the processor tracking unit 126 may wirelessly interface to the PPS 110. In accordance with other exemplary embodiments, other types of spatial trackers 120 may be used in the system 100 including, for example, an accelerometer/gyroscope-based tracker, an optical tracker (active or passive), an infrared tracker, an acoustic tracker, a laser tracker, a radio frequency tracker, an inertial tracker, and augmented reality based tracking systems. Other types of trackers may be possible as well. In some exemplary embodiments, a combination of two or more different tracking technologies can be employed.

Figure 7:
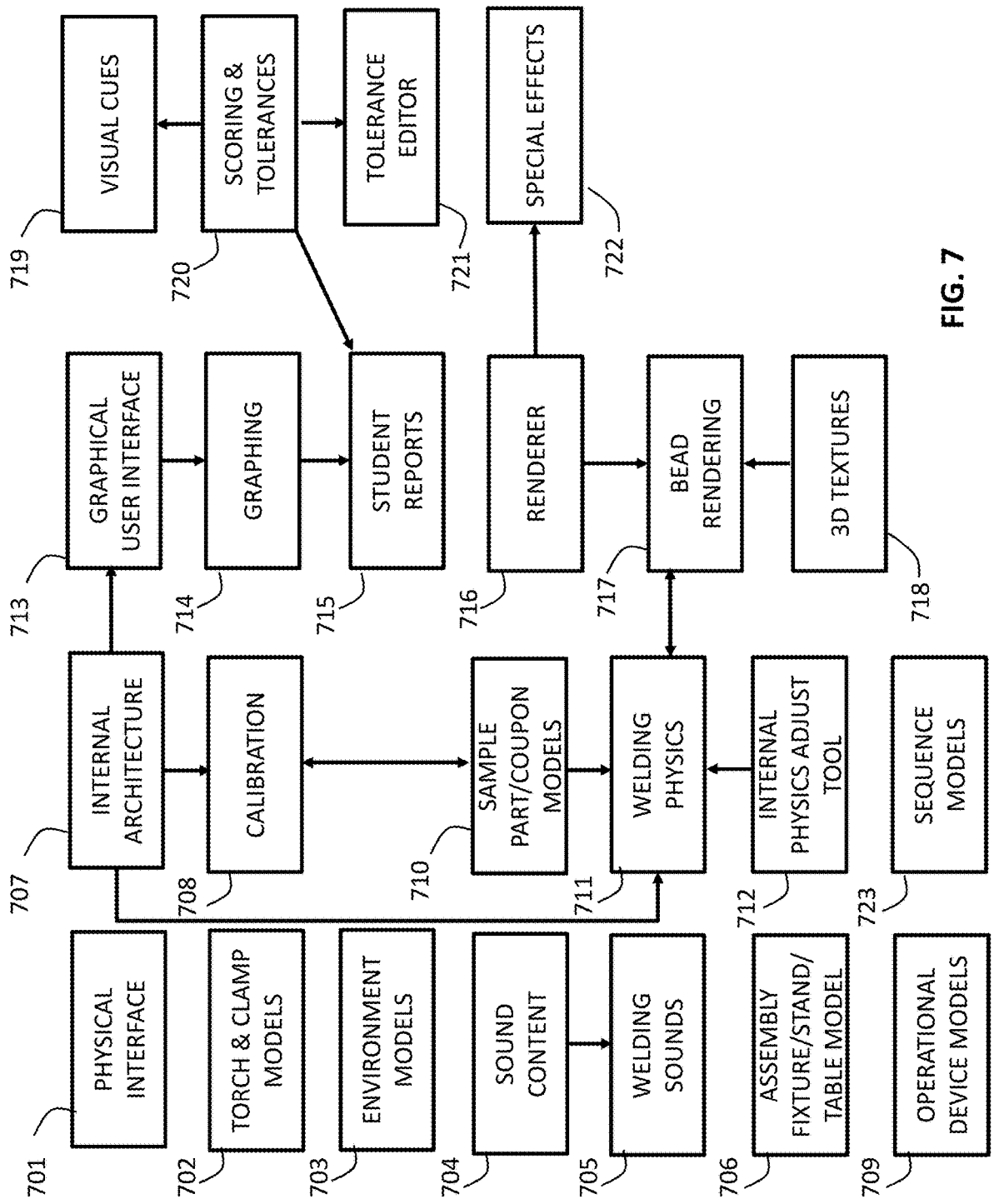
FIG. 7 is a block diagram that further illustrates the system of FIG. 1, according to an exemplary embodiment.

FIG. 7 illustrates an exemplary embodiment of the system 100 of FIG. 1. The various functional blocks of the system 100 as shown in FIG. 7 are implemented largely via software instructions and modules running on the PPS 110 and/or the VS 186. The various functional blocks of the system 100 include a physical interface 701, torch and clamp models 702, environment models 703, sound content functionality 704, welding sounds 705, assembly fixture/stand/table model 706, internal architecture functionality 707, calibration functionality 708, operational device models 709, sample part/coupon models 710, welding physics 711, internal physics adjustment tool (tweaker) 712, graphical user interface functionality 713, graphing functionality 714, student reports functionality 715, renderer 716, bead rendering 717, 3D textures 718, visual cues functionality 719, scoring and tolerance functionality 720, tolerance editor 721, special effects 722, and sequence models 723.

The functionality of the various blocks shown in FIG. 7 operates similarly to the functionality disclosed in U.S. Ser. No. 12/501,257, which, as noted above, is incorporated herein by reference in its entirety. Modeling of the AF 182 may be similar to the T/S 170 in block 706. Modeling of the SP 184 may be similar to the WC 180 in block 710. The graphical user interface functionality 713 may also include the SDUI 188 to set up/display the operations and steps of a simulated weld station scenario. In accordance with an exemplary embodiment, the set up of a welding scenario includes selecting a language, entering a user name, and selecting a weld station to simulate. In accordance with the selected weld station, the VS 186 can select the appropriate sequence models from block 723. The sequence models 723 will include the various aspects associated with the selected weld station's operations, specifying the process steps, including, for example, specifying the WC 180 and/or the SP 184; specifying the T/S 170 configuration and/or the AF 182; specifying one or more welding processes (e.g., FCAW, GMAW, SMAW) and associated axial spray, pulse, or short arc methods; specifying a gas type and flow rate; specifying a type of stick electrode; specifying a type of flux cored wire (e.g., self-shielded, gas-shielded); specifying an environment (e.g., a background environment in virtual reality space); specifying a wire feed speed; specifying a voltage level; specifying an amperage; specifying a polarity; and turning particular visual cues on or off. In other exemplary embodiments, the user may be prompted to specify certain options and/or parameters in accordance with the decisions an operator will have to specify in the real-world weld station processes that are being simulated.

The system 100 is capable of analyzing and displaying the results of virtual weld station activity. By analyzing the results, it is meant that the system 100 is capable of determining when, during the specified process steps, including welding and non-welding operations, the user has deviated from the acceptable limits of the specified processes. A score may be attributed to the user's performance. In one exemplary embodiment, the score may be a function of missed operations; improperly fixtured parts; and deviation in position, orientation, and speed of the mock welding tool 160 through ranges of tolerances, which may extend from an ideal welding pass to marginal or unacceptable welding activity, missed quality checks, or any other operations associated with the selected weld station.

Visual cues functionality 719 can provide immediate feedback to the user by displaying overlaid colors and indicators on the FMDD 140, the ODD 150, and/or the SDUI 188. Visual cues may be provided for each, or portions of each, of the operations associated with the selected weld station.

Figure 8:
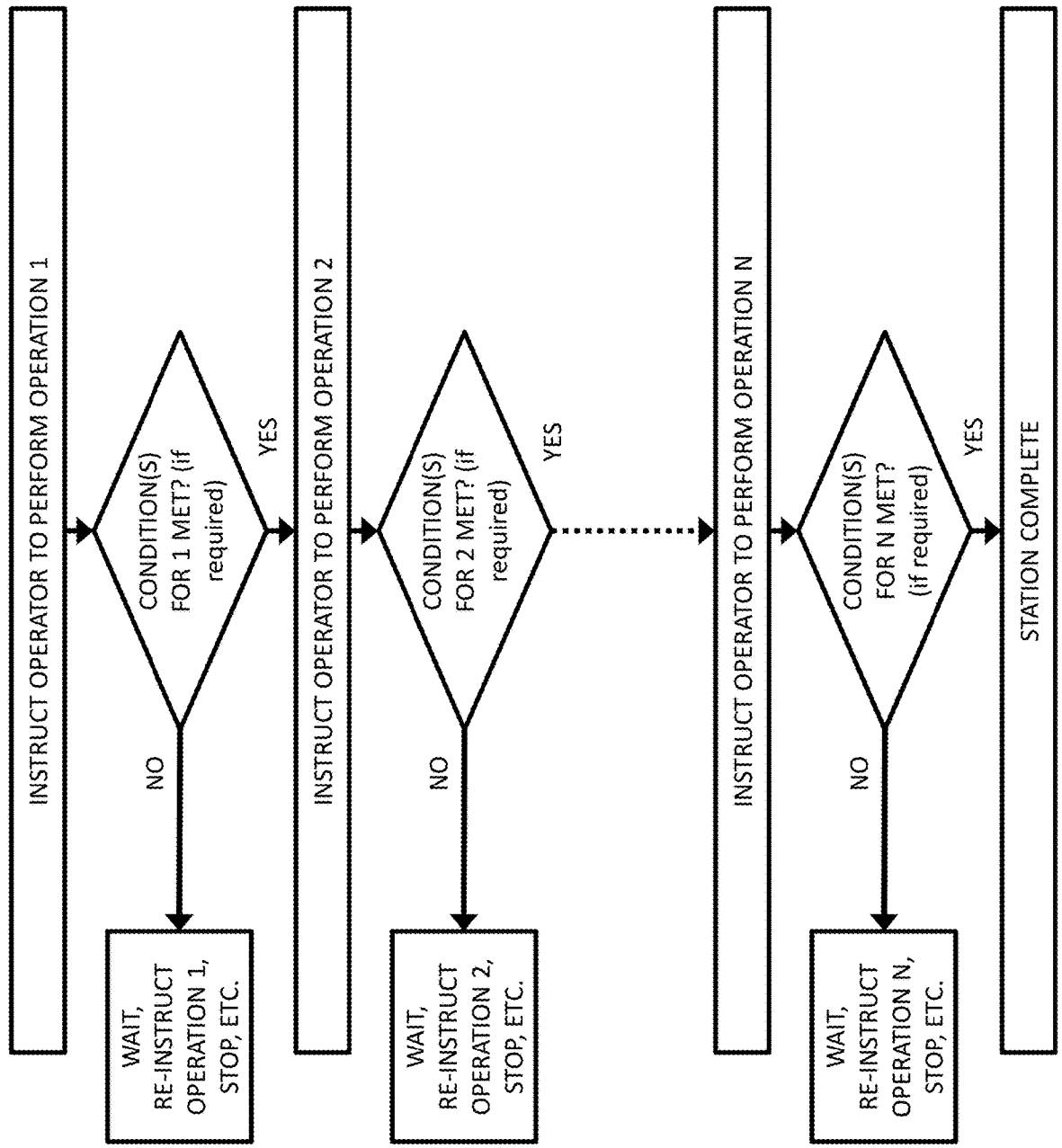
FIG. 8 is a flow chart that illustrates sequencer logic, according to an exemplary embodiment.

FIG. 8 is a flow diagram of sequencer logic, according to an exemplary embodiment. In this exemplary embodiment, the virtual sequencer can instruct the operator to perform any number of operations to simulate the real-world weld station. For example, the virtual sequencer can instruct the operator to perform operation 1 to achieve a particular state. Completion of operation 1 may also be associated with a condition check. If the condition is not met (e.g., part number not entered, part not placed in fixture, weld duration not long enough, etc.), the sequence may take an action, such as, for example, waiting, re-instructing, stopping, or any other action. These actions may be designed to mimic the desired action in the real-world weld station or may deviate from the real-world weld station to provide a better training experience for the operator (e.g., re-instruction). The sequence is complete when all of the operations are completed (and associated conditions are met) for the virtual weld station.

Figure 9:
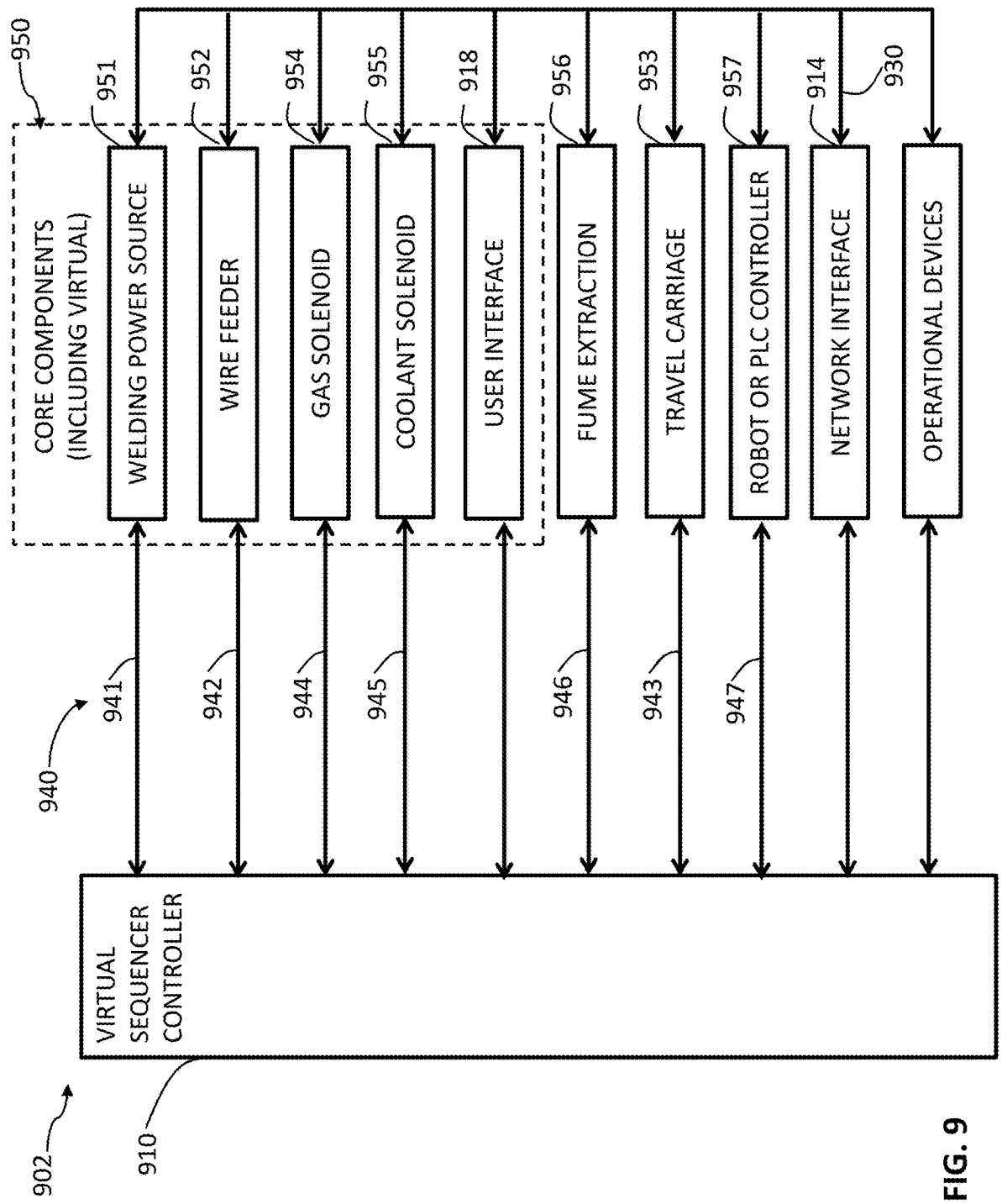
FIG. 9 is a system diagram that illustrates a virtual system with a reprogrammable virtual sequencer controller, according to an exemplary embodiment.
Figure 10:
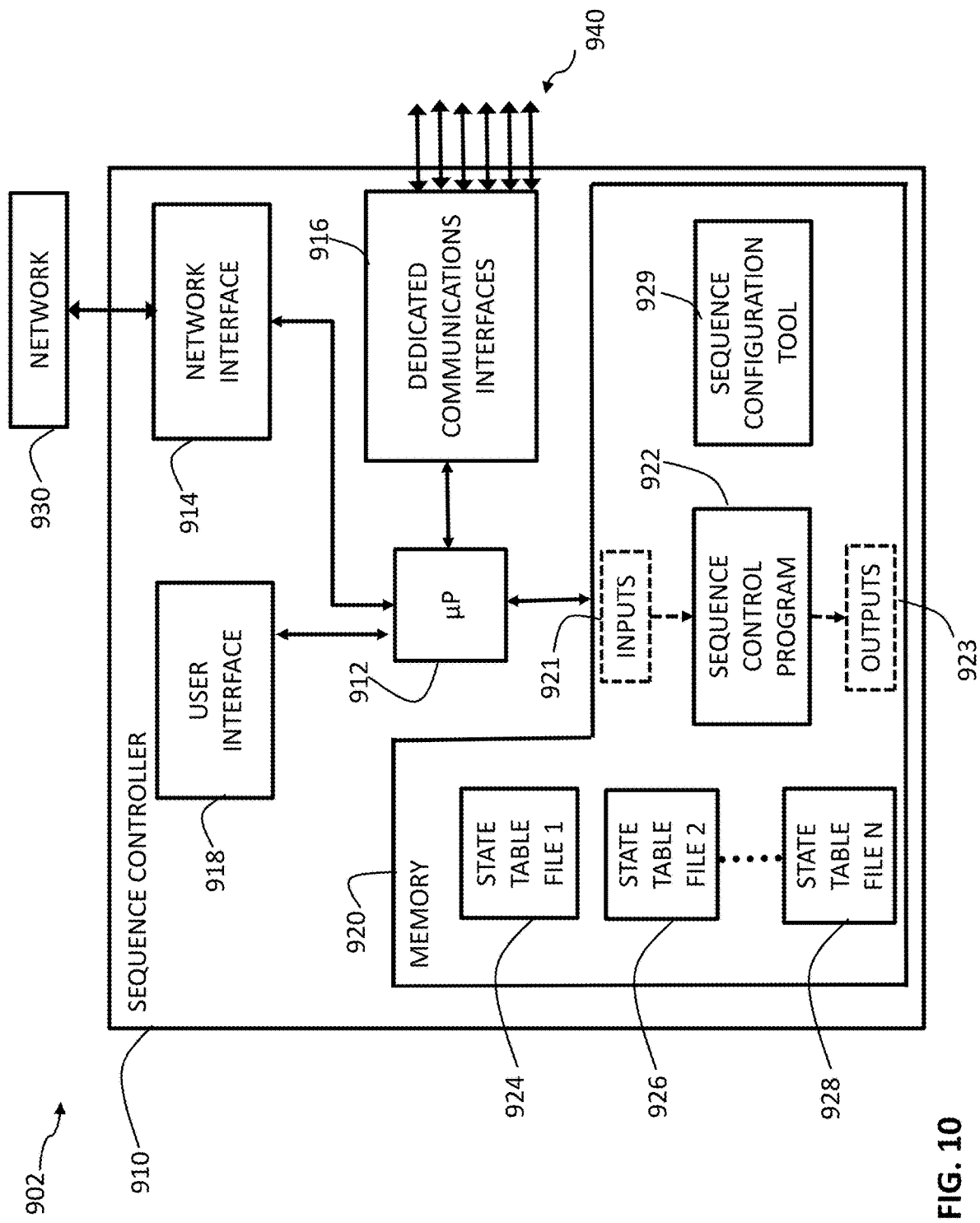
FIG. 10 is a schematic diagram that further illustrates the exemplary reprogrammable virtual sequencer controller of FIG. 9.
Figure 11:
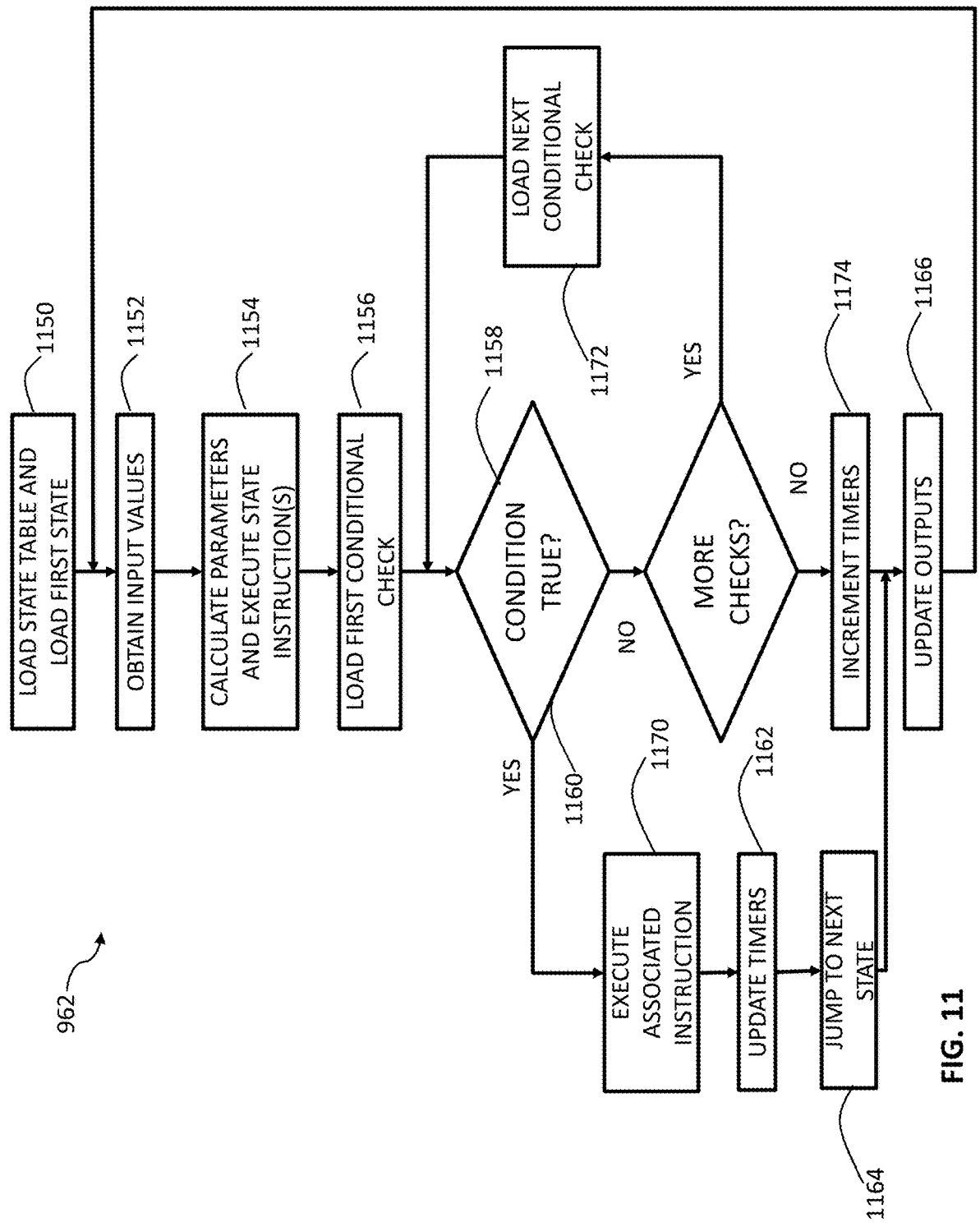
FIG. 11 is a flow chart that illustrates conditional checks in the exemplary virtual sequence controller of FIGS. 9 and 10.

FIGS. 9-12 describe a control system, according to an exemplary embodiment. Referring now to FIGS. 9-11, an exemplary control system 902 for system 100 of FIG. 1 is shown. In various embodiments, the control system 902 may be embodied in the PPS 110, the VS 186, the simulated welding console 135, and/or other components. The system 902 includes a plurality of welding system components 950, which are typically virtual components, including a power source 951, a wire feeder 952, a travel carriage 953, a gas solenoid 954, a coolant solenoid 955, a fume extraction system 956, and a robot or programmable logic controller (PLC) 957, where the illustrated system components 950 are merely examples, and a system may be provided with more or fewer components in accordance with the general inventive concepts. The virtual welding components may be included in a simulated welding console 135, as shown in FIG. 2. Real-world welding or non-welding components may be used in the virtual weld station if certain components cannot be simulated adequately.

As shown in FIG. 10, system 902 further comprises a virtual sequencer controller 910 with a microprocessor 912, a sequence control program 922, and one or more state table files 924, 926, 928, where the virtual sequencer controller 910 also provides various interfaces including a network interface 914 for operatively coupling the sequencer 910 with a network 930, one or more dedicated communications interfaces 916 providing direct communications connectivity with one or more of the system components 950 via cables 940, as well as a user interface 918 (such as, e.g., the SDUI 188 from FIG. 1) that provides operator or user access to the sequencer 910 for setting parameters, values, etc., and/or for rendering operational information to a user.

As shown in FIG. 8, the network 930 may couple one or more of the system components 950 and the controller 910 with one another and may also provide for data sharing and other information exchange between any of the components 910, 950, and external devices or other networks (not shown). This includes connecting to the same network as real-world weld stations.

Alternatively or in combination, moreover, dedicated cabling 940 may be used to interconnect the sequencer 910 with some or all of the welding system components 950, such as power source control cable 941, wire feeder cable 942, travel carriage cable 943, gas control cable 944, coolant solenoid control cable 945, fume extractor control cable 946, and/or a robot or PLC cable 947, wherein the interfacing via the network 930 (and the network interface 914) and/or the cables 940 (and the interfaces 916) provides for exchange of data or other information, signaling, messages, etc., by which sequence control inputs 921 can be obtained from one or more system components 950 and sequence control outputs 923 can be provided to one or more of the components 950.

In one exemplary implementation, the processor 912 is a microprocessor, microcontroller, DSP, programmable logic device, etc., although any form of computational processing component may be employed within the scope of the general inventive concepts, whether hardware, software, firmware, or combinations thereof, and which may be a single device or may be implemented in multiple components. It is further noted that the controller 910 may be integrated into one of the system components 950, such as the power source 951, the wire feeder 952, etc., wherein the user interface 918 may include one or more display devices, user control knobs, switches, keypads, etc., and may interface a user with aspects of the system component 950 as well as those of the sequencer controller 910. The controller 910, moreover, includes a memory 920, which may be any suitable data store, integrated or distributed, which is operatively coupled with the processor 912 to allow access by the processor 912 to files, programs, instructions, routines, data, etc. stored in the memory 920. It is noted that while the processing component 912 and the memory 920 may be integrated in one component, such as a unitary circuit board, these elements may be separately provided or distributed across multiple system components to provide a controller 910 within the scope of the general inventive concepts. The memory 920 stores the sequence control program 922 and the state table files 924, 926, 928 providing access thereto by the processor 912. The memory 920 may also include a sequence configuration tool 929, such as a software program that may also be executed by the processor 912. States may be used to define various stages of the assembly process, including semi-automatic or manual states expected at the end of individual operations (e.g., part in fixture, weld time, etc.) and/or automatic states occurring during an operation that are automatically controlled (e.g., changes in the welding parameters that occur during a single weld).

In an exemplary embodiment, the exemplary power source 951 and other components are state table based, wherein certain of the controller outputs 923 are provided as inputs 996 to the components. In operation, controller 910 provides a desired output level or levels as one or more controller outputs 923 and to the various virtual components, which employ the output level(s) to define and regulate the desired state of the component. For example, the controller 910 may regulate a particular welding state, a particular fixture state, etc. The microprocessor 912 executes a standard routine in accordance with the sequence control program, which simulates all of the operations (and their associated parameters) associated with the specified weld station. The controller can read each state, regulating the instruction(s) associated with the current state, and determining whether a series of conditional checks is true and if so, branching to the next state (or operation).

In some exemplary embodiments, certain checks can be made to ensure that the sequence is ready to advance to the next operation. FIG. 11 illustrates the operation of an exemplary control program 962 including conditional checks, wherein a first state table and data table are loaded at 1150 and input values are obtained at 1152. Parameters are calculated and state instructions are executed at 1154, whereafter a first conditional check is loaded at 1156 and tested (e.g., TRUE or FALSE) at 1158. If the first condition is true (YES at 1158), the program 962 executes the associated instruction at 1160, updates timers at 1162, and jumps to the corresponding next state at 1164, after which the outputs are updated at 1166, and the program 962 returns to 1152. If the first tested condition is not true (NO at 1158), a determination is made at 1170 as to whether more checks are specified for the current state, and if so (YES at 1170), the next conditional check is loaded at 1172, and the program tests the new condition at 1158 as described above. Once all conditional checks have been found untrue for the current state (NO at 1170), the program 962 updates the timers at 1174, updates the outputs at 1166, and then returns again to 1152 as described above.

Figure 12:
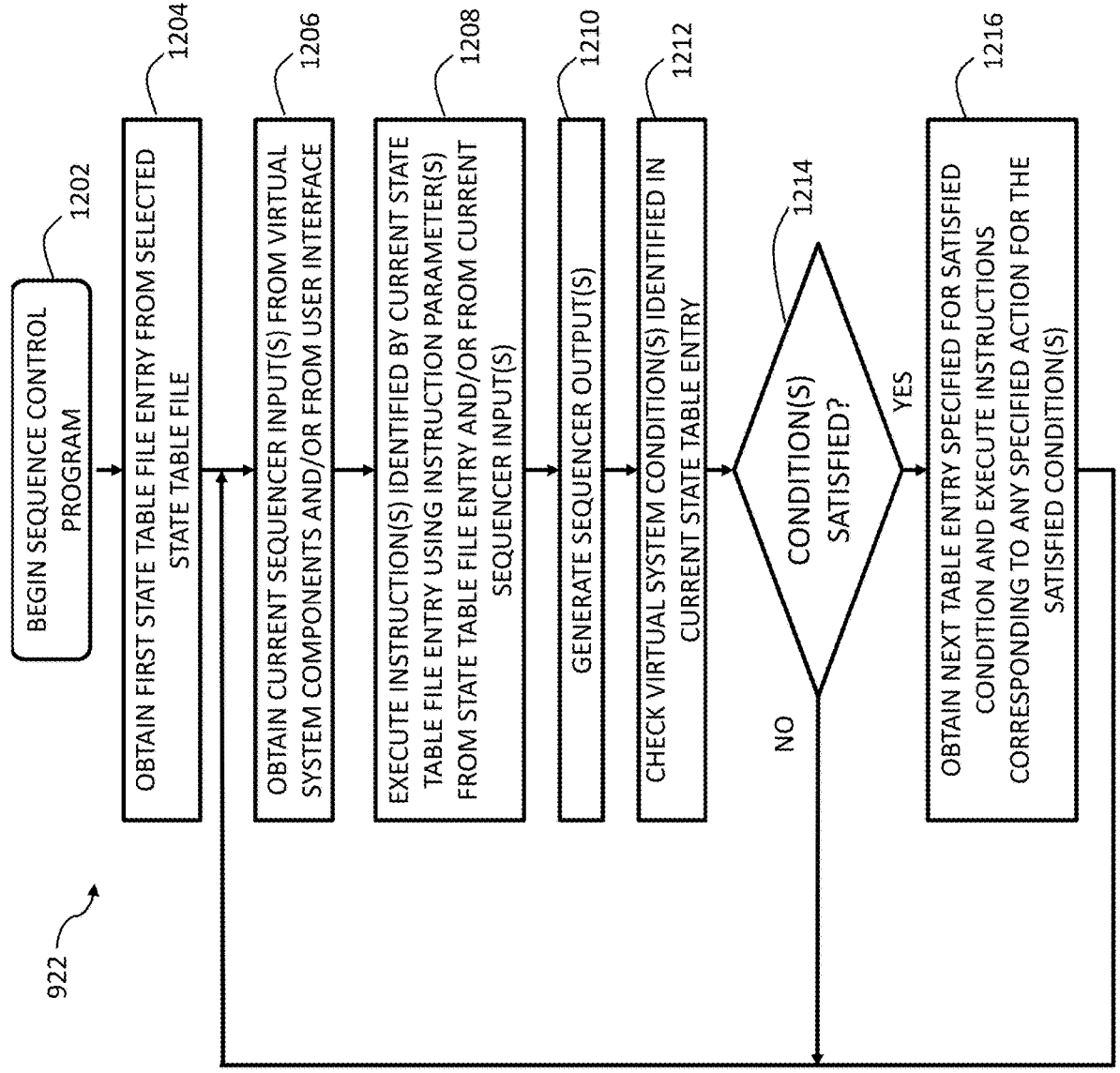
FIG. 12 is a flow chart that illustrates operation of a sequence control program in the exemplary virtual sequencer controller of FIGS. 9 and 10.

Referring to FIG. 12, the processor 912 executes an exemplary virtual sequence control program 922 according to the sequence controller inputs 921 and according to a selected sequence control state table file 924, 926, 928 to provide the sequence controller outputs 923 to perform a virtual operation by implementing the designated functions or instructions in state-by-state (or step-by-step) fashion, where the condition checks provide for branching to an appropriate next state based on the inputs, timers, etc. In operation, a user selects from the available state table files 924, 926, 928 (e.g., a virtual weld station sequence), using a selection feature on the sequencer user interface 918. Execution of the sequence control program 922 begins at 1202 in FIG. 12, where the processing component 912 obtains a current sequence control state table file entry at 1204 from the sequence control state table file 924, and obtains current sequence controller inputs 921 from at least one of the virtual system components at 1206. At 1208, the processor 912 executes one or more executable instructions or routines of the control program 922 identified by the instruction identifier(s) of the current entry using one or more instruction parameters thereof and provides the sequence controller outputs 923 at 1210. The virtual system condition(s) identified by one or more exit condition identifiers of the state table file entry are checked at 1212 and a determination is made at 1214 as to whether any identified exit conditions are satisfied according to the current sequence controller inputs 921, including any timers associated with the current state. If not, the current state is continued (NO at 1214), and the program execution returns to 1206-1212 as described above. In this manner, the sequence controller 910 implements a state of a given virtual sequence according to the state definition in the corresponding table file entry until one or more of the specified exit conditions have been met. Once an exit condition is satisfied (YES at 1214), the processor 912 obtains the next sequence control state table file entry at 1216 that corresponds to the satisfied exit condition identifier. Also, instructions or routines corresponding to any specified action identifiers for the satisfied condition are executed at 1216. Execution of the control program 922 then returns to obtain the current system inputs 921 at 1206 to execute the instructions identified in the new state table file entry and generate corresponding outputs 923 at 1208 and 1210, respectively, and to check the new state exit conditions at 1212 and 1214 as described above.

It is noted that the sequence control program 922 is fairly generic with respect to interoperation with the selected state table file 924, wherein the hard coded instructions and routines of program 922 are those appropriate to interface with and control the various system components and to obtain inputs therefrom, whereas the specific logic of a given virtual sequence is provided by the state table file entries and the elements thereof In this manner, the embodiments essentially decouple the virtual sequence logic in the table files 924, 926, 928 from the hard coded executable instructions and routines of the control program 922. Consequently, reconfiguration of an entire virtual system can be accomplished without recompiling and installing software or firmware and without hardware modification (e.g., no need to modify or recompile the sequence control program 922). Instead, a state table file 924, 926, 928 can be constructed and simply stored in memory 920 (or in any suitable data store accessible by the processing component 912) in order to implement a new virtual operational sequence. Furthermore, existing state table files 924, 926, 928 can be used as a starting point or template, with state table file entries being changed, added, or removed therefrom to implement new or modified virtual operations using the sequence controller 910. If sequencer state table files 924, 926, 928 are created outside of memory 920, moreover, such files may be easily downloaded to a data store accessible by the processing component 912. In this regard, virtual system operators or service personnel may configure the sequence controller 910 and hence an entire virtual system from a remote location, according to the general inventive concepts, where the state table files 924, 926, 928 can be downloaded via the network 930 and other networks operationally connected thereto, including LANS, WANS, Internet connections, etc. Furthermore, it is noted that the elements of state table file entries can be any tags, strings, pointers, addresses, etc. that provide an indication of instructions, routines, numeric values, states, or actions that can be understood by processor 912 when executing the sequence control program 922. Thus, sequence configuration tool 929 (FIG. 10) can be any suitable hardware, software, firmware, or combinations thereof that can obtain the elements and logic of a virtual sequence and create a state table file 924, 926, 928 and entries thereof, and which can then be used in performing a virtual operation.

Figure 13:
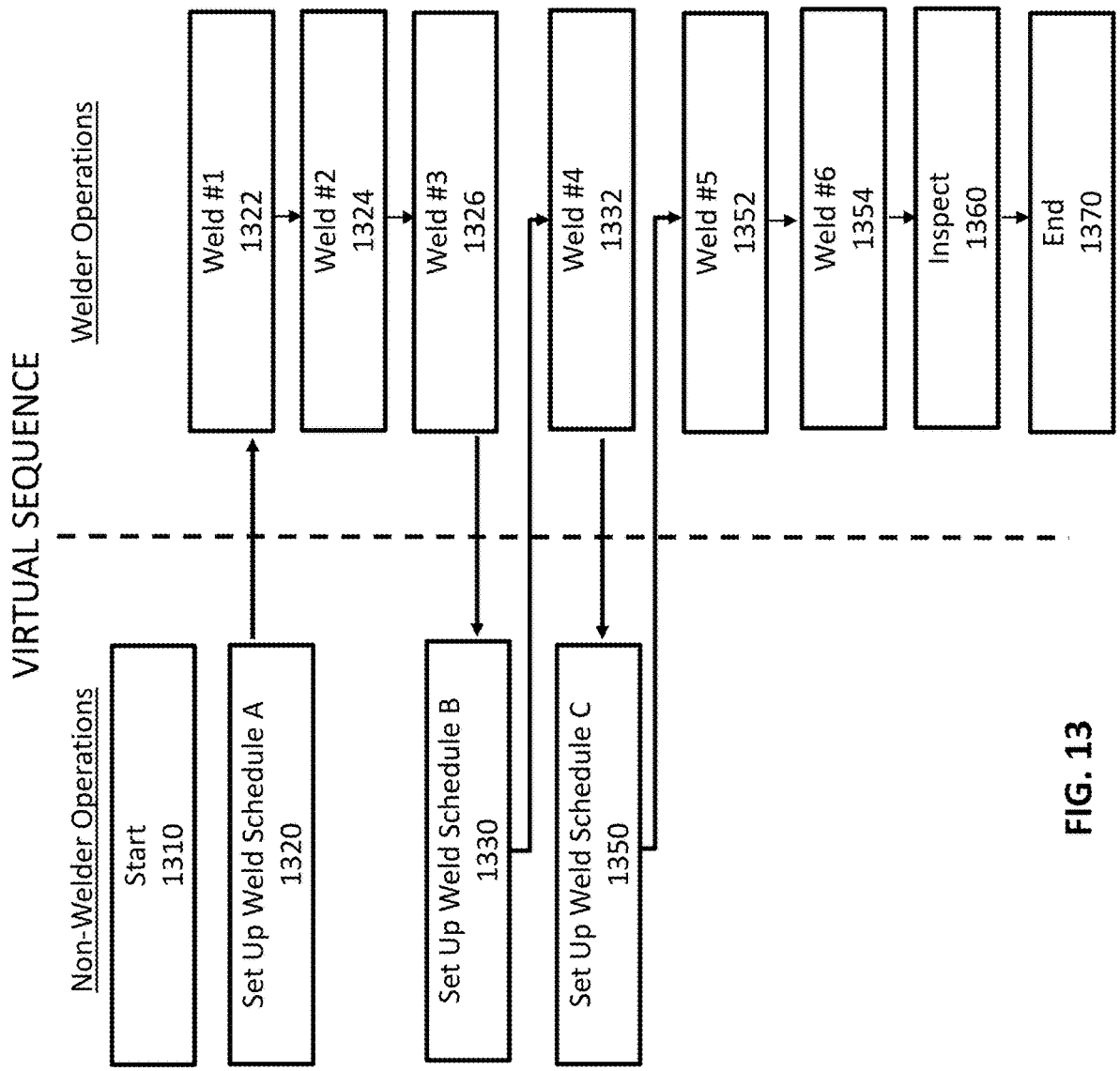
FIG. 13 is a flow diagram that illustrates exemplary operations included in a virtual sequence utilizing a semi-automatic welding work cell, according to an exemplary embodiment.

An exemplary embodiment of a virtual sequence including various welder (operator) and non-welder operations is diagrammatically represented in FIG. 13. In FIG. 13, at operation 1310, the virtual sequencer begins operation and can instruct the operator to enter the operator's identification number, proper part identification number, assembly identification number, etc. The virtual sequencer may also set the virtual welding equipment to use weld schedule A (operation 1320) and instruct the operator to virtually perform welds #1, #2, and #3. Then, the operator virtually performs welds #1, #2, and #3 using weld schedule A (operations 1322, 1324, and 1326). Next, the virtual sequencer sets the virtual welding equipment to use weld schedule B (operation 1330) and instructs the operator to perform weld #4. Then, the operator performs weld #4 using weld schedule B (operations 1332). After completion of weld schedule B, the virtual sequencer sets the virtual welding equipment to use weld schedule C (operation 1350) and instructs the operator to perform welds #5 and #6 and to visually inspect the part. Then, the operator performs welds #5 and #6 (operations 1352, and 1354) using weld schedule C and inspects the completed part or assembly to confirm that it is correct (operation 1360). This inspection may include dimensional verification, visual defect confirmation, or any other type of check that might be needed. Further, operation 1360 may include a requirement that the operator affirmatively indicate that the inspection is complete, such as by pressing an "OK" button, before it is possible to proceed to the next operation. Lastly, the virtual sequencer indicates that the virtual welding operation is at an end (operation 1370) and re-sets for the next operation. Data, including production data, can be gathered during all operations.

Accordingly, as noted above, the sequencing and scheduling of virtual welding operations is completed, or otherwise facilitated, by the sequencer, simulating the real-world welding station. Other operations automatically performed by the virtual sequencer could include, for example, changing the position of a fixture, actuating operational devices, displaying visual aids, controlling audible and visual indicators, verifying certain checks, etc. Other operations directed by the virtual sequencer for the welder operator could include, for example, retrieving a sample part, entering a sample part ID, placing the sample part in a fixture, actuating fixture clamps, performing a test, etc.

The virtual sequencer may select and implement a new function, such as the selection and implementation of weld schedules A, B and C shown in FIG. 13, based upon various variables or inputs. For example, the virtual sequencer may simply select new weld schedules based upon a monitoring of elapsed time since the beginning of the welding operations or since the cessation of welding (such as the time after weld #3 in FIG. 13 above). Alternatively, the virtual sequencer may monitor the actions of the operator, compare the actions to the identified sequence of welds, and select new weld schedules appropriately.

Still further, various combinations of these methods, or any other effective method, may be implemented, as long as the end effect is to simulate the real-world sequence and environment in the real-world weld station. By way of example, and not by way of limitation, the following real-world functions may be simulated in the virtual weld station and included in the virtual sequence.

A Quality Check function requires that a quality check of the weld be performed (either during welding or after the weld is completed) before allowing the job sequence to continue. The quality check can monitor various virtual welding parameters and can pause the welding operation and alert the operator if an abnormality is detected. An example of a welding parameter measurable by this function would be arc data.

Another exemplary function is a Repeat function. This function would instruct the operator to repeat a particular virtual weld or weld sequence. An example of the use of this function includes when the Quality Check function shows an abnormality, or when multiple instances of the same weld are required.

Another exemplary function is a Notify Welder function, which communicates information to the welder. This function would display information, give an audible signal, or communicate with the welder by some other means. Examples of use of this function include an indication to the operator that he is free to begin virtual welding or an indication that the operator should check some portion of the welded part for quality purposes.

Another exemplary function is an Enter Job Information function. This function will require the welder to enter information, such as the sample part serial number, a personal ID number, or other special conditions before the virtual sequencer can continue. This information could also be read from a sample part or inventory tag itself through RFID, bar code scanning, or the like. The virtual sequencer could then utilize the entered information for the virtual welding operations. An example of the use of this function would be as a predicate to the entire virtual welding operation, so as to indicate to the virtual sequencer which schedules and/or sequences should be selected.

Another exemplary function is a Job Report function. This function will create a report on the virtual welding job, which could include information such as: the number of virtual welds performed, total and individual arc timing, sequence interruptions, errors, faults, wire usage, arc data, and the like. An example of the use of this function would be to report to a manufacturing quality department on the efficiency and quality of the virtual processes.

Another exemplary function is a System Check function. This function will establish whether the virtual welding job can continue and could monitor such parameters as: wire supply, gas supply, time left in the shift (as compared to the required time to finish the job), and the like. The function could then determine whether the parameters indicate that there is enough time and/or material for the virtual welding job to continue. This function simulates efforts to prevent down-time due to material depletion and would prevent work-in-process assemblies from being delayed, which can lead to quality problems due to thermal and scheduling issues.

Further, as mentioned above, the virtual sequencer may select and implement a new function, based upon various variables or inputs. These variables and inputs are not particularly limited and can even be another function. For example, another exemplary function compatible with the virtual sequencer is a Perform Welding Operation function. This function is designed to detect the virtual welding performed by the operator and to report that welding so that the virtual sequencer can determine whether to proceed with further operations. For example, this function can operate by starting when the operator pulls the trigger to start the virtual welding operation and finishing when the operator releases the trigger after the virtual welding is complete, or after a predetermined period of time has lapsed. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of virtual welding steps at a single work-cell can be fully integrated into a virtual complete production schedule, which itself can be modified as needed to track variations in the virtual production schedule. Sequencing and/or scheduling information can also be stored in a database, be stored by date as archival information, and be accessed to provide various virtual production reports.

The exemplary virtual weld station embodiments described above and in the figures, including the exemplary virtual sequencer embodiments, can be used for a variety of training and operational optimization techniques, including lesson plans based on the following procedures. Production monitoring data may be gathered, compared, and manipulated in one or more common or separate databases from both virtual and real-world operations.

Figure 14:
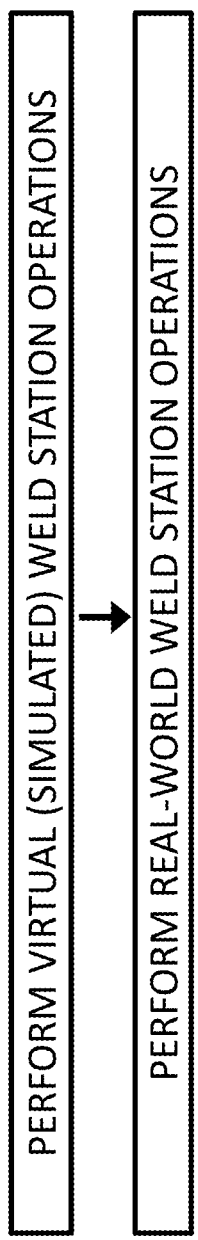
FIG. 14 is a flow chart that illustrates a training routine, according to an exemplary embodiment.

For example, FIG. 14 is a flow chart illustrating an exemplary training routine. An operator can perform virtual weld station operations before proceeding to real-world welding operations.

Figure 15:
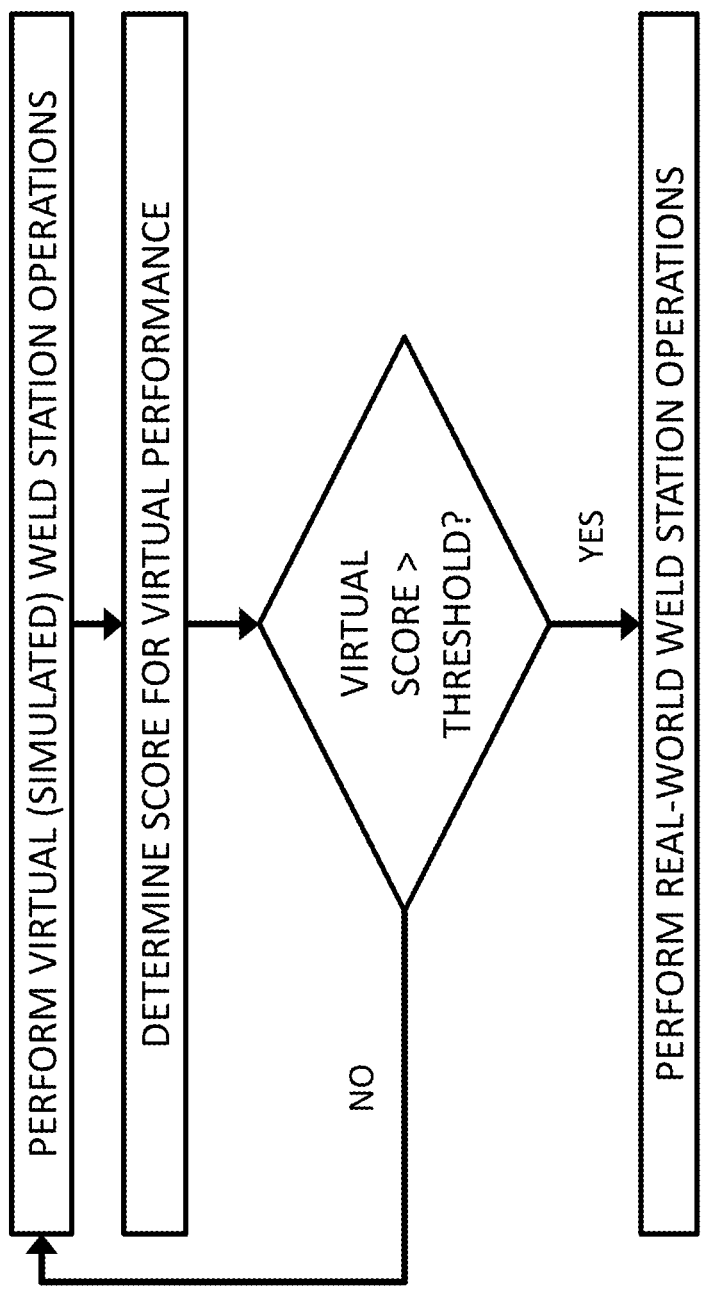
FIG. 15 is a flow chart that illustrates a training routine using a virtual score, according to an exemplary embodiment.

FIG. 15 is a flow chart illustrating an exemplary training routine using a virtual score. In this embodiment, the operator must achieve a certain score before proceeding to operate in the real-world weld station.

Figure 16:
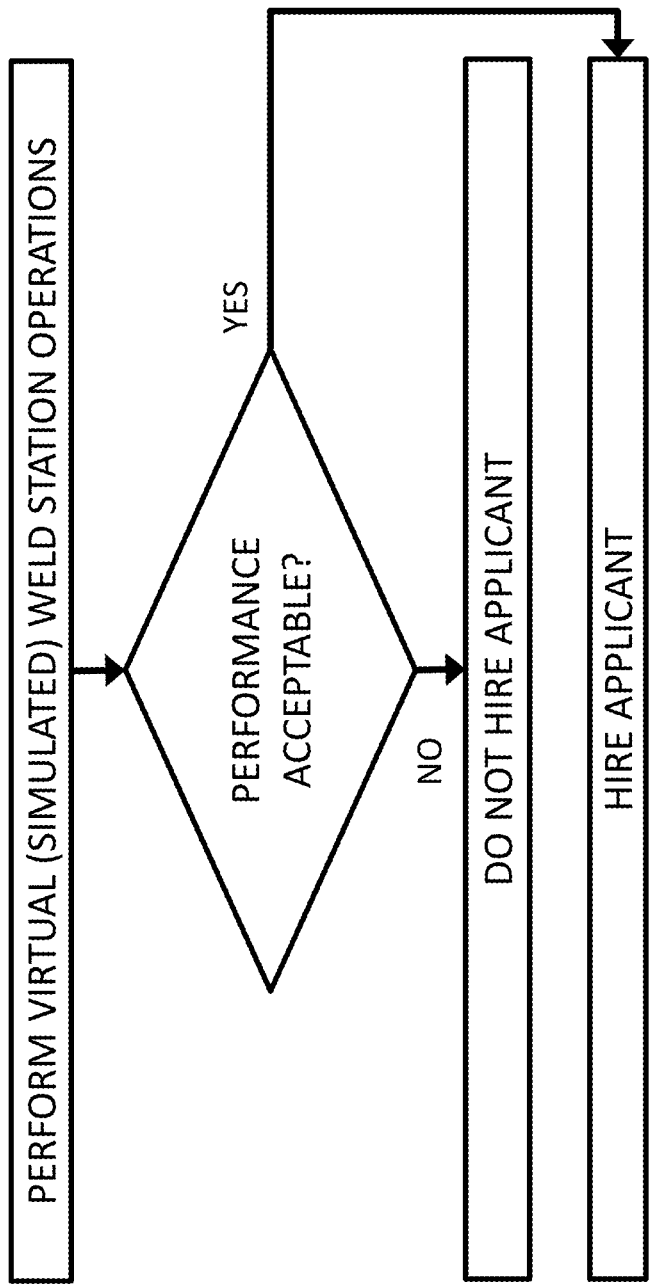
FIG. 16 is a flow chart that illustrates a hiring process using a virtual performance measure, according to an exemplary embodiment.

FIG. 16 is a flow chart illustrating an exemplary hiring process using a virtual performance measure. In this embodiment, the applicant (operator) must achieve a certain performance using the virtual weld station to be hired.

Figure 17:
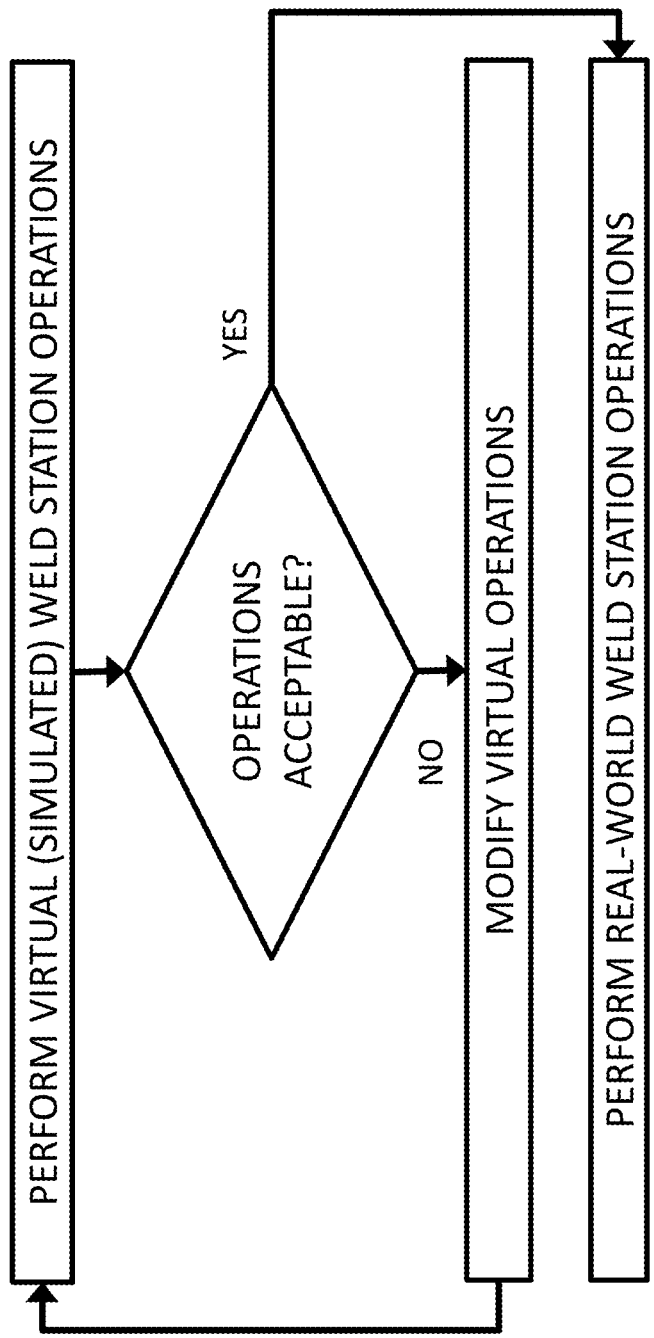
FIG. 17 is a flow chart that illustrates an optimization routine using a virtual weld station, according to an exemplary embodiment.

FIG. 17 is a flow chart illustrating an exemplary optimization routine using a virtual weld station. In this embodiment, the virtual weld station is used to optimize some aspect of the proposed sequence of operations. The virtual operations are modified until one or more aspects are acceptable (e.g., exceed some predetermined threshold or satisfy one or more quality parameters). Then, the virtual sequence is used as the real-world sequence.

Figure 18:
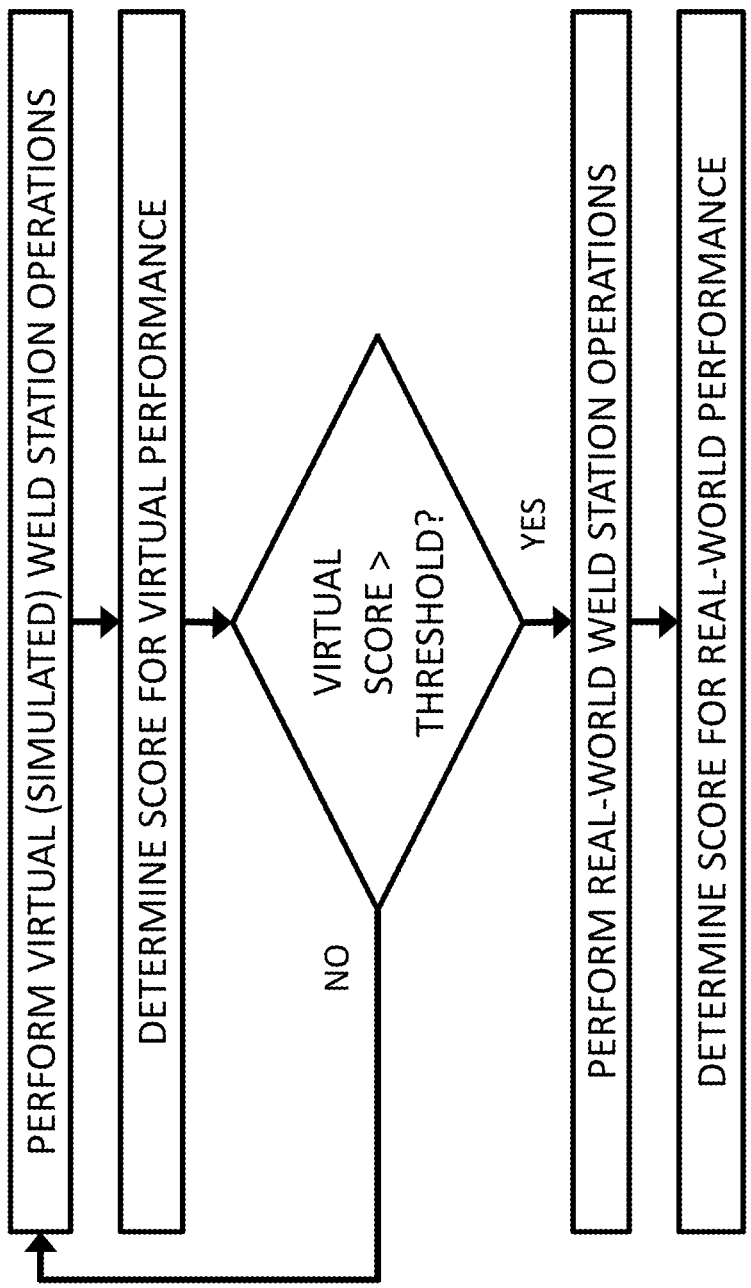
FIG. 18 is a flow chart that illustrates a training routine using a virtual score and a real-world score, according to an exemplary embodiment.

FIG. 18 is a flow chart illustrating an exemplary training routine using a virtual score and a real-world score. In this embodiment, the operator must achieve a certain score before proceeding to operate in the real-world weld station. Then, a real-world sequencer (e.g., Lincoln Electric's Weld Sequencer) is used by the same operator on the same operation, and a real-world score is determined.

Figure 19:
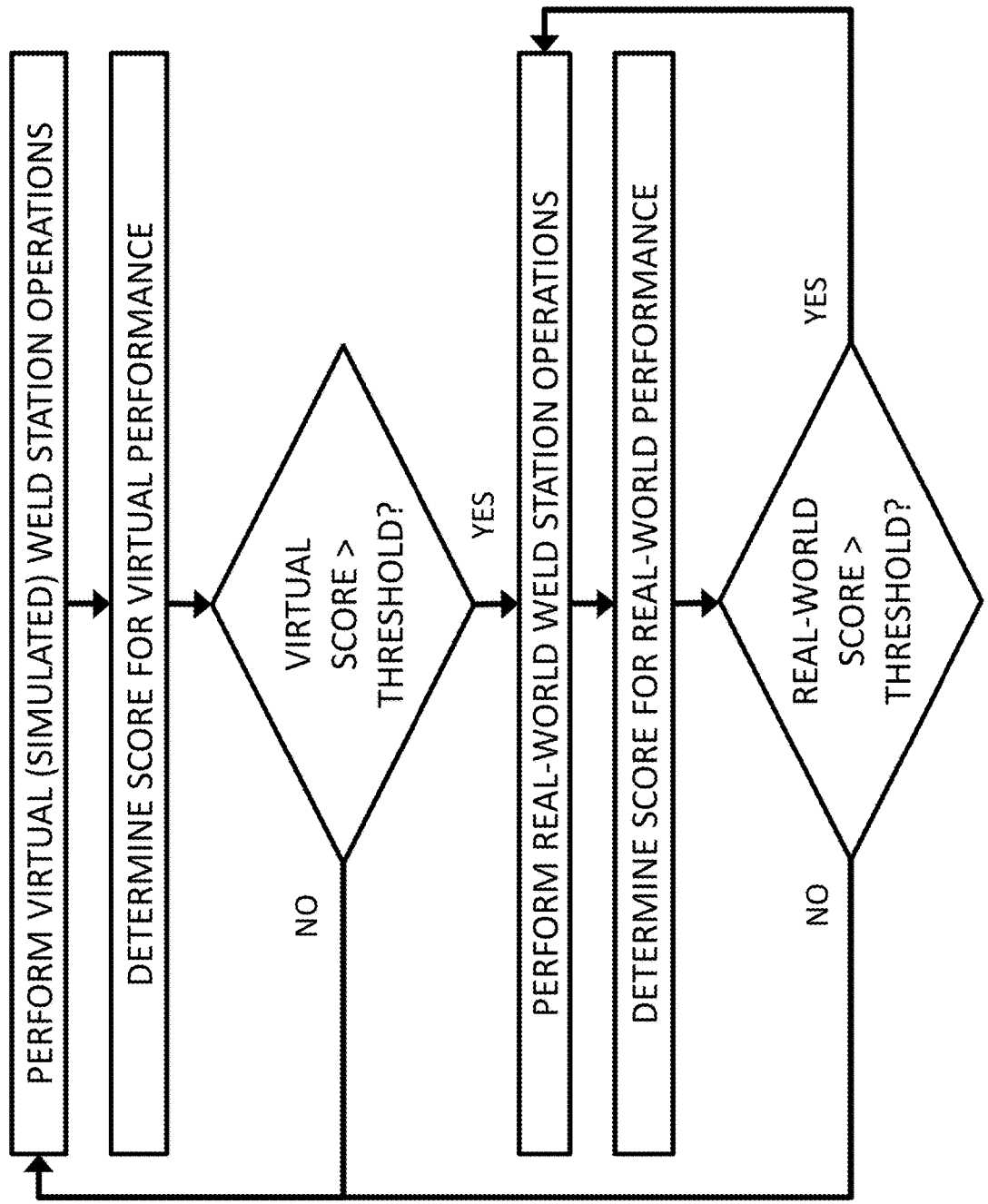
FIG. 19 is a flow chart that illustrates a training routine using a virtual score and a real-world score, according to an exemplary embodiment.

FIG. 19 is another flow chart illustrating an exemplary training routine using a virtual score and a real-world score. In this embodiment, the operator must achieve a certain score before proceeding to operate in the real-world weld station. Then, a real-world score is determined, and if the real-world score falls below a threshold, the operator can be further trained using the virtual weld station.

Figure 20:
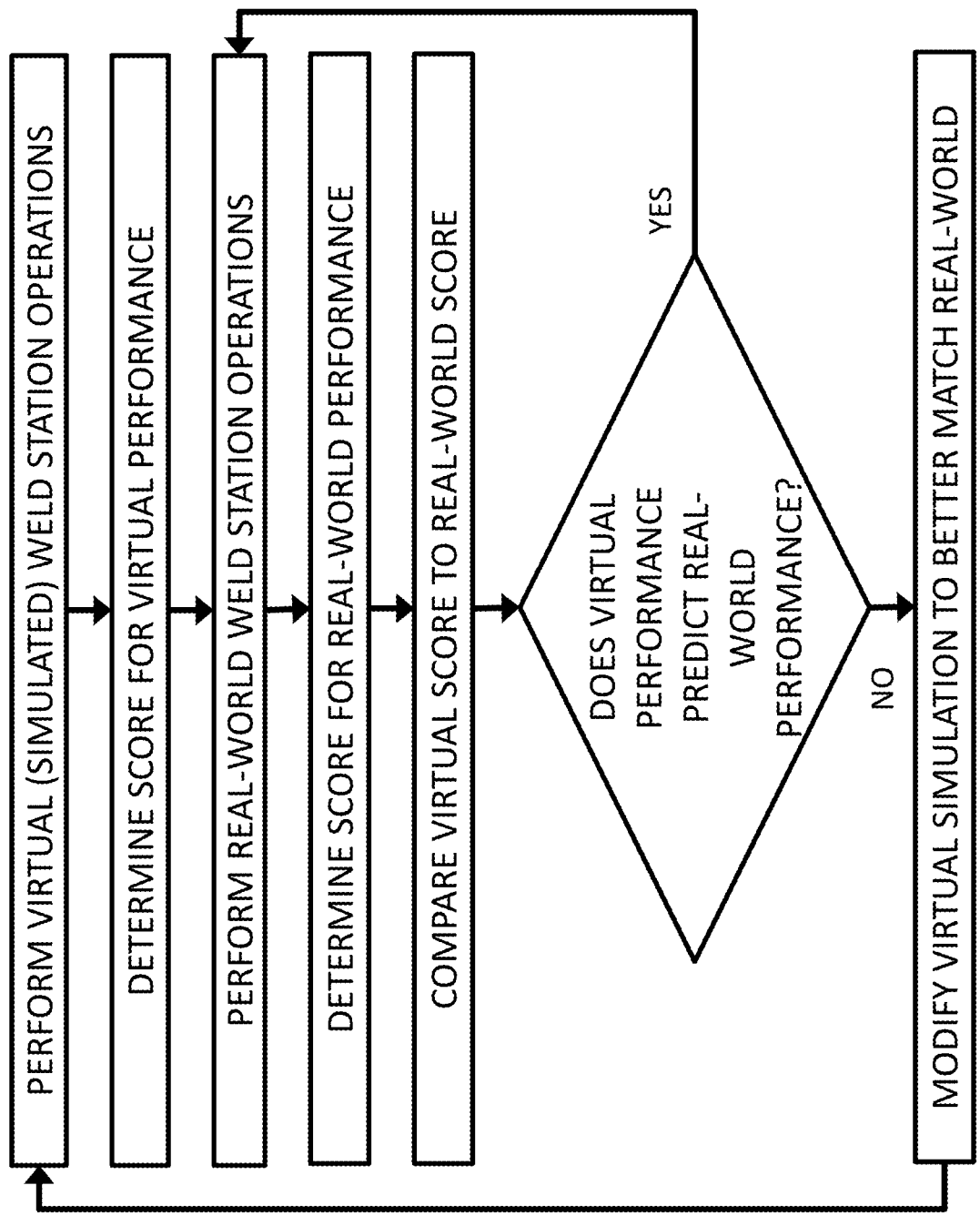
FIG. 20 is a flow chart that illustrates a routine using a virtual score and a real-world score to determine how well the virtual station predicts real-world performance, according to an exemplary embodiment.

FIG. 20 is another flow chart illustrating a routine using a virtual score and a real-world score to determine how well the virtual station predicts real-world performance. In this embodiment, the virtual and real-world performance scores are compared to determine how well the virtual simulation predicts the real-world performance. If the correlation is not sufficient, the virtual simulation may be modified.

As can be seen, the virtual weld station and virtual sequencer can be used to gather and store a wealth of data that can be used to calculate and ultimately increase productivity. This data can be stored in a data "cloud" and then accessed for analysis and manipulation. The virtual sequencer can monitor and instruct the user to prevent missing welds, missing welding steps, missing other operations, excessive use of welding consumables, and other undesirable activities. The virtual sequencer can also be used to train users in the proper time for accomplishing or completing various welding or non-welding steps on a particular assembly. The virtual sequencer also leads to a consistent process order for making a particular weldment assembly. The virtual sequencer also reduces training time and scrap. The number of times each user had to be trained on certain assemblies to flag problematic parts for a particular user can also be determined. All of these items lead to increased productivity and less waste of time and resources.

While the general inventive concepts have been illustrated by the description of various embodiments thereof, and while the embodiments have been described in some detail, it is not the intention of the applicant to restrict, or in any way limit, the scope of the appended claims to such detail. Additional advantages and modifications will be readily apparent to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concepts.

The invention claimed is:
1. A virtual welding system comprising:
    a logic processor based subsystem operable to execute coded instructions for generating an interactive welding environment that emulates a welding activity on a virtual weld joint defined by at least one of a welding coupon and a sample part;
    a virtual sequence controller operatively connected to the logic processor based subsystem for implementing a virtual sequence;

a display operatively connected to the logic processor based subsystem for visually depicting the interactive welding environment including the virtual weld joint;

an input device for performing a virtual welding activity on the virtual weld joint in real time; and a spatial tracker comprising one or more sensors adapted to track movement of the input device in real time for communicating data about the movement of the input device to the logic processor based subsystem, wherein the virtual sequence includes a plurality of operations to be performed in order, each operation intended to achieve a particular state, wherein at least one of the operations is a manual operation to be performed by a user, and wherein at least one of the operations is an automatic operation to be performed by the virtual welding system.

2. The virtual welding system of claim 1, further comprising a user interface for the user to provide input to the virtual welding system.

3. The virtual welding system of claim 1, wherein the virtual sequence controller comprises a microprocessor, a sequence control program, and a memory, and wherein the memory stores one or more state table files.

4. The virtual welding system of claim 3, wherein the virtual sequence is defined by at least one of the state table files.

5. The virtual welding system of claim 3, wherein the user selects one of the state table files based on a task to be performed; and wherein the task is production of a complete virtual assembly.

6. The virtual welding system of claim 1, further comprising a virtual sequence display;

wherein the virtual sequence display displays information on at least one of the operations.

7. The virtual welding system of claim 1, wherein the particular state is associated with a condition.

8. The virtual welding system of claim 7, wherein the virtual sequence controller performs an action if the condition is not met.

9. The virtual welding system of claim 1, wherein the display is a face-mounted display.

10. The virtual welding system of claim 1, further comprising a support structure.

11. The virtual welding system of claim 10, wherein the support structure is a stand comprising a base, a vertical post, an adjustable table, and an adjustable arm.

12. The virtual welding system of claim 10, wherein the support structure is an assembly fixture for holding the sample part.

13. The virtual welding system of claim 1, wherein the automatic operation is one of specifying a weld process, specifying a gas type, specifying a gas flow rate, specifying a stick electrode type, specifying a flux cored wire type, specifying a wire feed speed, specifying a voltage level, specifying an amperage, specifying a polarity, and specifying a background environment for the interactive welding environment.

14. The virtual welding system of claim 1, wherein the virtual welding system is operable to assign a quality score to the virtual welding activity.

15. The virtual welding system of claim 14, wherein the quality score is used to determine whether the user is qualified to perform the welding activity on a real-world weld joint.

16. The virtual welding system of claim 14, wherein the quality score is used to assess the efficacy of the virtual sequence.

* * * * *